(12) United States Patent
Kim et al.

(10) Patent No.: US 9,542,343 B2
(45) Date of Patent: Jan. 10, 2017

(54) MEMORY MODULES WITH REDUCED RANK LOADING AND MEMORY SYSTEMS INCLUDING SAME

(71) Applicant: SAMSUNG ELECTRONICS CO., LTD., Suwon-Si, Gyeonggi-Do (KR)

(72) Inventors: Jeong-Kyoum Kim, Seoul (KR); In-Dal Song, Seoul (KR); Jung-Hwan Choi, Hwaseong-Si (KR)

(73) Assignee: Samsung Electronics Co., Ltd., Suwon-si, Gyeonggi-do (KR)

(*) Notice: Subject to any disclaimer, the term of this patent is extended or adjusted under 35 U.S.C. 154(b) by 540 days.

(21) Appl. No.: 14/091,385

(22) Filed: Nov. 27, 2013

(65) Prior Publication Data

US 2014/0149631 A1 May 29, 2014

Related U.S. Application Data

(60) Provisional application No. 61/731,002, filed on Nov. 29, 2012.

(30) Foreign Application Priority Data

Apr. 8, 2013 (KR) .................. 10-2013-0037874

(51) Int. Cl.
*G06F 13/00* (2006.01)
*G06F 13/16* (2006.01)
*G06F 13/40* (2006.01)

(52) U.S. Cl.
CPC ....... *G06F 13/1689* (2013.01); *G06F 13/4022* (2013.01)

(58) Field of Classification Search
USPC .................................................. 710/305–317
See application file for complete search history.

(56) References Cited

U.S. PATENT DOCUMENTS

| 6,487,102 | B1 | 11/2002 | Halbert et al. |
| 6,530,006 | B1 | 3/2003 | Dodd et al. |
| 6,658,523 | B2 | 12/2003 | Janzen et al. |
| 7,078,793 | B2* | 7/2006 | Ruckerbauer .......... G11C 5/063 257/686 |
| 7,165,153 | B2 | 1/2007 | Vogt |
| 7,246,250 | B2 | 7/2007 | Jung et al. |
| 7,296,110 | B2 | 11/2007 | Chung et al. |
| 7,366,821 | B2 | 4/2008 | Fukaishi et al. |
| 7,480,774 | B2 | 1/2009 | Ellis et al. |
| 7,965,530 | B2 | 6/2011 | Han et al. |

(Continued)

FOREIGN PATENT DOCUMENTS

KR 0389916 6/2003

*Primary Examiner* — Raymond Phan
(74) *Attorney, Agent, or Firm* — Volentine & Whitt, PLLC

(57) ABSTRACT

A memory module includes memory devices arranged in ranks and columns and designated in first and second groupings, the first grouping includes memory devices arranged in only a first rank nearest a memory controller and directly connected to the memory controller, the memory devices in the second grouping are indirectly connected to the memory controller via a corresponding memory device in the first grouping arranged in a same column, and each memory device selectively provides either self-data retrieved from a constituent memory core or other-data retrieved from a memory core of another memory device during the read operation.

19 Claims, 19 Drawing Sheets

(56) References Cited

U.S. PATENT DOCUMENTS

| | | | |
|---|---|---|---|
| 8,516,185 B2* | 8/2013 | Lee | G11O 5/025 |
| | | | 711/104 |
| 8,539,145 B1* | 9/2013 | Warnes | G06F 13/1684 |
| | | | 365/189.05 |
| 8,627,003 B2* | 1/2014 | Cromer | G06F 15/177 |
| | | | 711/104 |
| 9,171,585 B2* | 10/2015 | Rajan | G11C 7/10 |
| 2006/0036826 A1 | 2/2006 | Dell et al. | |
| 2011/0016250 A1 | 1/2011 | Lee et al. | |
| 2015/0089164 A1* | 3/2015 | Ware | G11C 5/02 |
| | | | 711/149 |

* cited by examiner

1180

191 OR 192

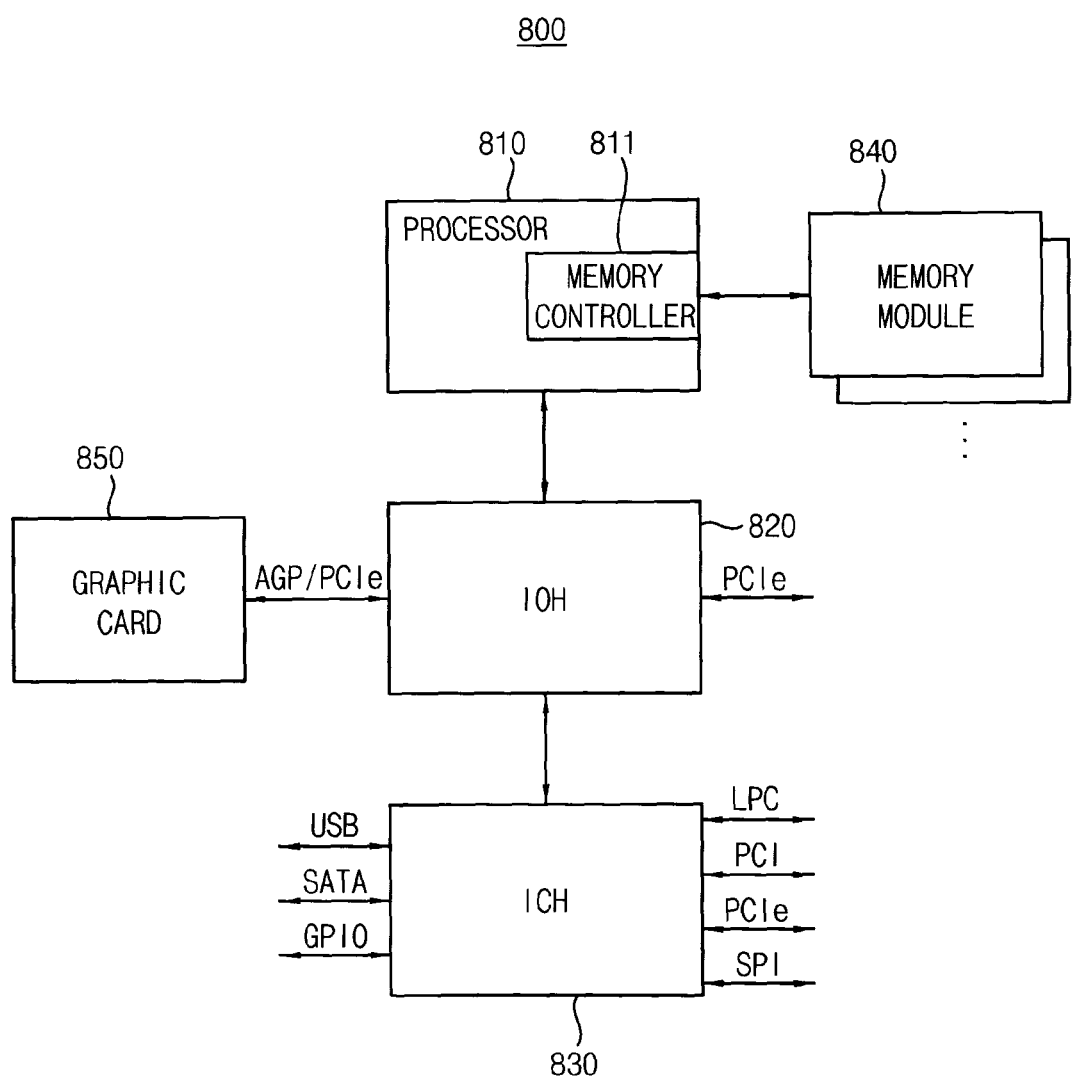

MEMORY MODULES WITH REDUCED RANK LOADING AND MEMORY SYSTEMS INCLUDING SAME

CROSS-REFERENCE TO RELATED APPLICATION

This U.S. Non-provisional patent application claims priority under 35 USC §119 to U.S. Provisional Patent Application No. 61/731,002 filed on Nov. 29, 2012, and Korean Patent Application No. 10-2013-0037874 filed on Apr. 8, 2013, the collective subject matter of which is hereby incorporated by reference.

BACKGROUND

The inventive concept relates to memory modules and memory systems including at least one memory module. Many contemporary memory systems include at least one memory module having a plurality of memory devices mounted in an arrangement that includes columns and ranks.

There is continuing pressure to provide improved memory system performance. Improved memory system performance may generally be achieved by increasing operating speed (i.e., the speed with which data may be received and stored by and/or provided from the memory system) and expanding data storage capacity. In the context of a memory module, expanding data storage capacity may be accomplished in a number of different ways. For example, the number of ranks arranged on the memory module may be increased. However, this approach lead to rank loading effects that tend to slow the operating speed of the constituent memory system.

SUMMARY

Certain embodiments of the inventive concept provide memory module(s) having a relatively expanded number of memory device ranks without necessarily generating deleterious rank loading effects. Other embodiments of the inventive concept provide memory system incorporating such memory module(s).

In certain embodiments, the inventive concept provides a memory module comprising: memory devices arranged on a module board in a number of ranks and a number of columns and including a first grouping of memory devices and a second grouping of memory devices, the first grouping includes memory devices arranged in a first rank nearest a memory controller that controls execution of a read operation directed to the memory devices, the memory devices in the first grouping are each directly connected to the memory controller, the memory devices in the second grouping are each indirectly connected to the memory controller via a corresponding memory device in the first grouping arranged in a same column, and each memory device in the first grouping is configured to selectively provide either self-data retrieved from a constituent memory core or other-data retrieved from a memory core of a memory device in the second grouping during the read operation.

In certain embodiments, the inventive concept provides a memory system comprising; a memory module comprising memory devices arranged on a module board in ranks and columns, each memory device being operatively designated in one of a first grouping and a second grouping; and a memory controller that controls execution of a read operation directed to the memory devices. The first grouping includes only memory devices arranged in a first rank nearest the memory controller and the second grouping includes memory devices arranged in all ranks other than the first rank, the memory devices in the first grouping are each directly connected to the memory controller in parallel via a corresponding data port, each memory device in the second grouping and arranged in a same column is indirectly connected to the memory controller via a corresponding memory device in the first grouping, and each memory device in the first grouping is configured to selectively provide either self-data retrieved from a constituent memory core or other-data retrieved from a memory core of a memory device in the second grouping during the read operation.

BRIEF DESCRIPTION OF THE DRAWINGS

FIG. 20 is a block diagram illustrating a computing system according to example embodiments.

DETAILED DESCRIPTION

Certain embodiments of the inventive concept will now be described in some additional detail with reference to the accompanying drawings. The inventive concept may, however, be embodied in many different forms and should not be construed as being limited to only the illustrated embodiments. Rather, these embodiments are provided so that this disclosure will be thorough and complete, and will fully convey the scope of the inventive concept to those skilled in the art. Throughout the written description and drawings, like reference numbers and labels are used to denote like or similar elements.

It will be understood that, although the terms first, second, etc. may be used herein to describe various elements, these elements should not be limited by these terms. These terms are used to distinguish one element from another. For example, a first element could be termed a second element, and, similarly, a second element could be termed a first element, without departing from the scope of the inventive concept. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments and is not intended to be limiting of the inventive concept. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 1:
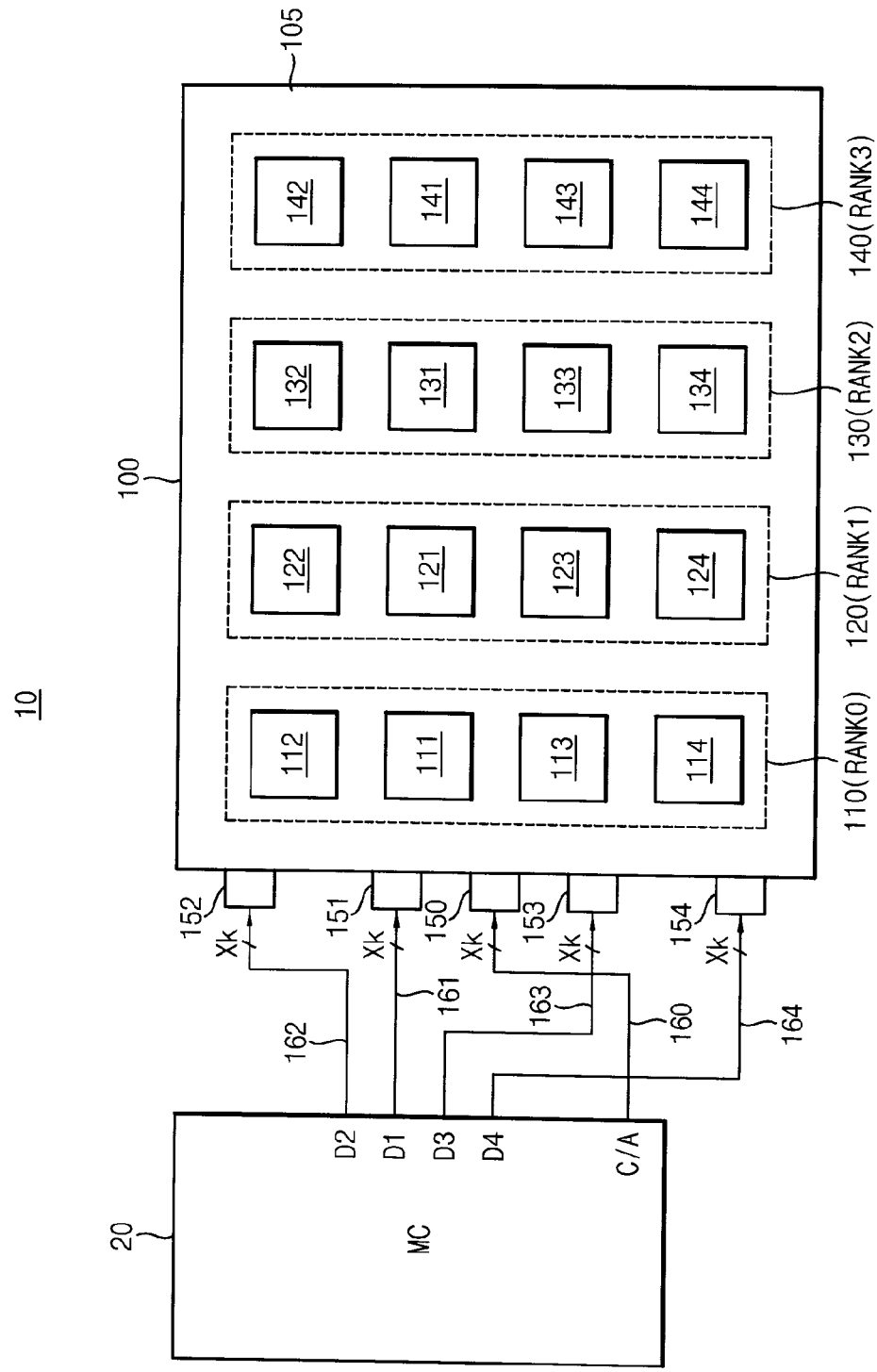
FIG. 1 is a block diagram illustrating a memory system according to an embodiment.

FIG. 1 is a block diagram illustrating a memory system according to an embodiment of the inventive concept.

Referring to FIG. 1, a memory system 10 generally comprises a memory controller 20 and a memory module 100.

The memory module 100 includes multiple pluralities (hereafter, "sets") of memory devices 110, 120, 130 and 140 arranged on a module board 105. In FIG. 1 as a convenient example, the first set of memory devices 110 includes first memory devices 111~114, the second set of memory devices 120 includes second memory devices 121~124, the third set of memory devices 130 includes third memory devices 131~134, and the fourth set of memory devices 140 includes fourth memory devices 141~144. Thus, the memory module 100 of FIG. 1 may be said to have a multi-rank architecture, wherein the first set of memory devices 110 constitute a first rank RANK0, the second set of memory devices 120 constitute a second rank RANK1, the third set of memory devices 130 constitute a third rank RANK2, and the fourth set of memory devices 140 constitute a fourth rank RANK3.

The memory module 100 also includes data ports 151, 152, 153 and 154, as well as a command/address (C/A) port 150. Data ports D1, D2, D3 and D4 of the memory controller 20 are respectively connected to the data ports 151, 152, 153 and 154 of the memory module 100 via data buses 161, 162, 163 and 164, and a C/A port of the memory controller 20 is connected to the C/A port 150 of the memory module 100 via a C/A/ bus 160. The data ports 151, 152, 153 and 154 of the memory module 100 may be configured to transmit data to and/or receive data from (hereafter, singularly or collectively "transmit/receive") the memory controller 20 via respective data buses 161, 162, 163 and 164. It is assumed that in certain embodiments of the inventive concept, the data being thus communicated is multi-bit data (e.g., four (4) bit data, or eight (8) bit data). In this manner, the memory module 100 will receive "write data" (i.e., data to be written to, and stored by one or more of the memory devices on the memory module 100) from the memory controller 20, and will transmits "read data" (i.e., data retrieved from one or more of the memory devices on the memory module 100) to the memory controller 20 via at least one of the data ports 151, 152, 153 and 154.

The first set of memory devices 110 may be operationally grouped with the second set of memory devices 120 in a first "grouping" of memory devices. Similarly, the third set of memory devices 130 and the fourth set of memory devices 140 may be arbitrarily grouped into a second grouping of memory devices. During a read operation directed to the memory module 100, each memory device in the first grouping may be configured to transmit "self-data" (i.e., data retrieved from its constituent memory core) and/or "other-data" (i.e., data retrieved from the memory core of at least one memory device in the second grouping of memory devices). The transmission of self-data verses other-data may be controlled by one or more chip selection signal(s).

Figure 2:
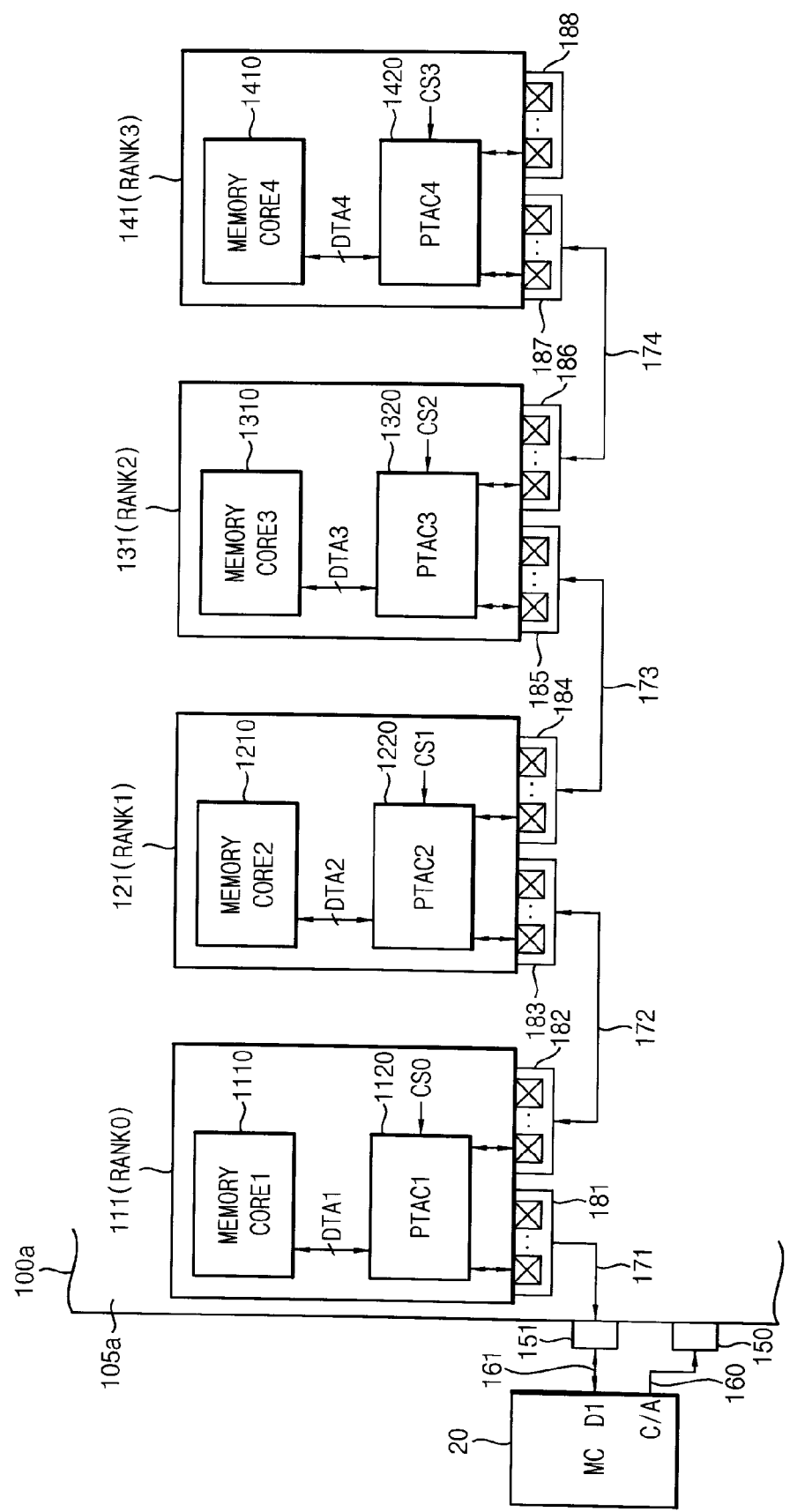
FIG. 2 illustrates how the memory devices in the memory module of FIG. 1 are connected according to an exemplary embodiment

FIG. 2 is a block diagram further illustrating operation of certain columnar memory devices arranged on the module board 105a of the memory module 100a according to an embodiment of the inventive concept.

In FIG. 2, the memory devices 111, 121, 131, and 141 are arranged and commonly connected in a column of the memory module 100a. The other memory devices of memory module 100 may be similarly arranged and operated in respective columns (e.g., memory devices 112, 122, 132, and 142 in a first column; memory devices 113, 123, 133, and 143 in a third column; and memory devices 114, 124, 134, and 144 in a fourth column).

In FIG. 2, the first memory device 111 in the illustrated column is assumed to include a first memory core 1110, a first path and timing adjusting circuit (PTAC) 1120, "near" data pins 181 and "far" data pins 182. The first memory core 1110 may be used to store first data DTA1. That is, the first data DTA1 may be data written to or read from the first memory core 1110. The first PTAC 1120 may be used to selectively provide the first data DTA1 to the first near data pins 181 in response to a first chip selection signal CS0. The near data pins 181 are connected to the data port 151 via a first internal data bus segment 171.

A second memory device 121, third memory device 131, and fourth memory device 141 are similarly arranged and operated. That is, each successive memory device in the illustrated column is connected in a daisy-chain manner via internal data bus segments 171, 172, 173 and 174) using a set of near data pins 181, 183, 185 and 187) and a related set of far data pins 182, 184, 186, and 188), where "near" and "far" in this context are arbitrary designations made in relation to a data transmission direction and the memory controller 20. Thus, for memory devices having two sets of related data pins, those data pins used to transmit data towards a memory controller may be deemed "near" while those data pins used to transmit data away from the memory controller (i.e., further down a column of memory devices) may be deemed "far" data pins.

The operative choice between near and far data pins (181/182, 183/184, 185/186 and 187/188) may be controlled by respective PTACs (1120, 1220, 1320 and 1420) in response to corresponding chip selection signals (CS0, CS1, CS2, and CS3).

With this configuration and during a read operation directed to the memory module 100, the first memory device 111, for example, may select for transmission to the memory controller 20 self-data (i.e., first data DTA) obtained from the first memory core 1110 and/or other-data obtained from the memory core of another memory device in the column (i.e., second, third and/or fourth data DTA2~DTA4). One or both of the self-data and other-data may be transmitted to the memory controller 20 via the near data pins 181 and the data port 151.

For example, when the first chip selection signal CS0 is activated, the first memory device 111 may transmit self-data and/or other-data to the memory controller 20 via the first PTAC 1120, the first near data pins 181, the first internal data bus segment 171 and the data port 151 during a read operation. Similarly, when the second chip selection signal CS1 is activated, the second memory device 121 may transmit self-data and/or other-data (i.e., data obtained from the third memory core 1310 and/or fourth memory core 1410) to the memory controller 20 via the second PTAC 1220, the second near data pins 183, the second internal data bus segment 172, the first far data pins 182, the first near data pins 181, the first internal data bus segment 171, and the data port 151.

In this configuration, the respective sets of near/far data pins 181~188 may include ×4 pins, ×8 pins or ×16 pins, for example. That is, a number of data pins may be configured in parallel according to the bandwidth requirements for the memory module 100. Thus, in the illustrated embodiment of FIG. 2, each of the memory devices 111, 121, 131, 141 may provide ×16 bandwidth and the memory module 100 may have 4-rank configuration with ×8 bandwidth.

And when the columnar-arranged memory devices 111, 121, 131 and 141 of FIG. 1 are operatively connected as shown in FIG. 2, the memory controller 20 need only bear the loading of the first memory device 111 of the first rank RANK0 when the memory controller 20 transmits/receives data. Therefore, the memory module 100 of FIGS. 1 and 2 may include an expanded the number of ranks without necessarily impacting operating speed.

Figure 3:
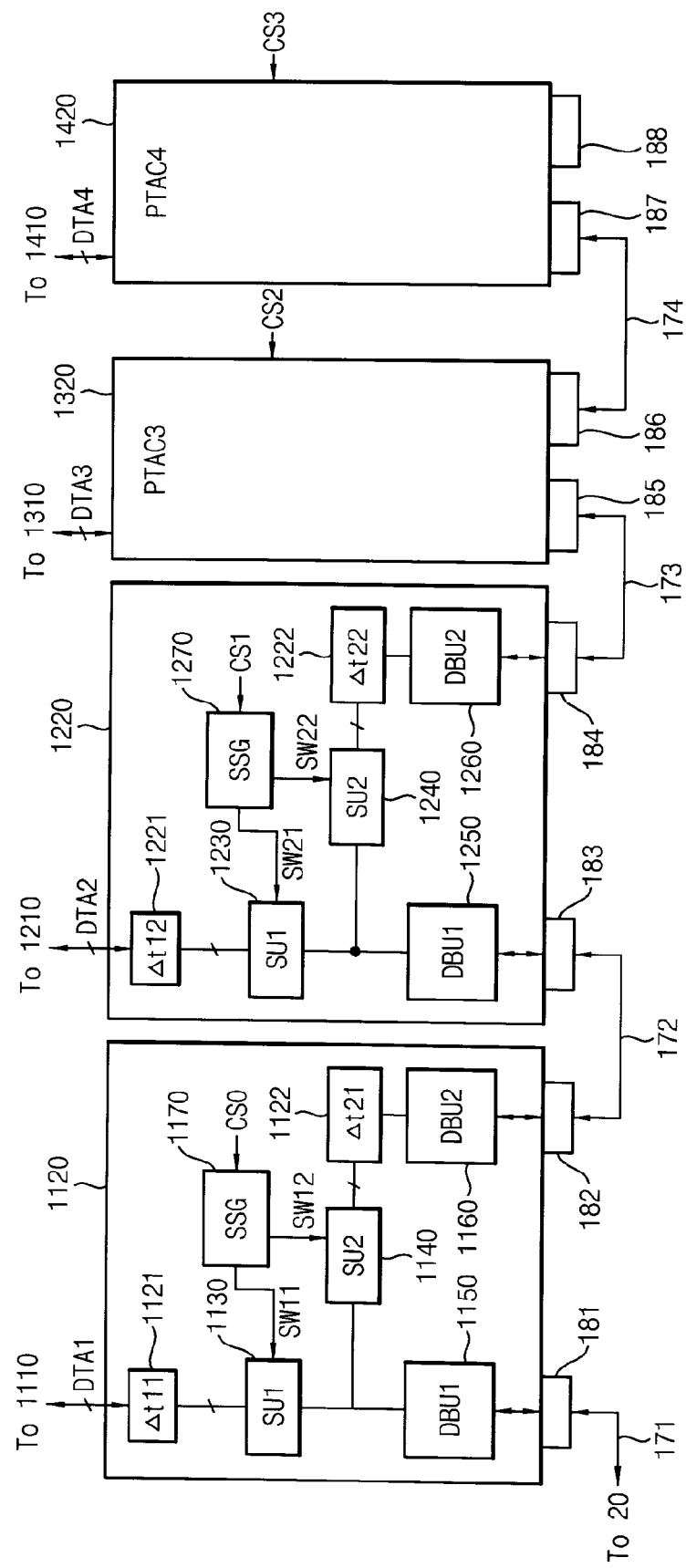
FIG. 3 is a block diagram illustrating an example of the path and timing adjusting circuit (PTAC) in FIG. 2 according to an exemplary embodiment.

FIG. 3 is a block diagram further illustrating in one example the various PTAC of FIG. 2 according to an embodiment of the inventive concept.

In FIG. 3, only the first and second PTACs 1120 and 1220 are shown in some additional detail recognizing that the third and fourth PTACs 1320 and 1420 may be similarly configured.

Referring to FIG. 3, the first PTAC 1120 includes a first delay unit 1121, a second delay unit 1122, a first switching unit 1130, a second switching unit 1140, a first data input/output (I/O) buffer unit 1150, a second data I/O buffer unit 1160 and a switching signal generator 1170. In addition, the second PTAC 1220 includes a first delay unit 1221, a second delay unit 1222, a first switching unit 1230, a second switching unit 1240, a first data I/O buffer unit 1250, a second data I/O buffer unit 1260 and a switching signal generator 1270.

The first delay unit 1121 delays the first data DTA1 by a first delay time $\Delta t11$ to be provided to the first switching unit 1130. The first switching unit 1130 selectively provides the self-data (first data DTA1) to the first data I/O buffer unit 1150 in response to a first switching control signal SW11. For example, when the first chip selection signal CS0 is activated, the first switching control signal SW11 is activated and the first switching unit 1130 provides the first data DTA1 to the first data I/O buffer unit 1150. When first chip selection signal CS0 is not activated, the first switching control signal SW11 is not activated and the first switching unit 1130 does not provide the self-data to the first data I/O buffer unit 1150.

The second data I/O buffer unit 1160 provides the second delay unit 1122 with other-data received from the memory device 1220 via the far data pins 182. The other-data transferred from the memory device 1220 may be determined according to the various chip selection signals CS1~CS3. For example, when the second chip selection signal CS1 is activated, the second data DTA2 of the second memory core 1210, which is other-data to the first memory device 1111, may be provided to the second data I/O buffer unit 1160, or when the third chip selection signal CS2 is activated, the third data DTA3 of the third memory core 1310 may be provided to the second data I/O buffer unit 1160, or when the fourth chip selection signal CS3 is activated, the fourth data DTA4 from the fourth memory core 1410 may be provided to the second data I/O buffer unit 1160.

In this configuration, the second delay unit 1122 may be used to delay incoming other-data by an appropriate second delay time $\Delta t21$ to be provided to the second switching unit 1140. The second switching unit 1140 selectively provides the other-data to the first data I/O buffer unit 1150 in response to a second switching control signal SW12. For example, when the first chip selection signal CS0 is not activated, the second switching control signal SW12 is activated and the second switching unit 1140 provides the other-data to the first data I/O buffer unit 1150. When first chip selection signal CS0 is activated, the second switching control signal SW12 is not activated and the second switching unit 1140 does not provide the other data to the first data I/O buffer unit 1150.

The switching signal generator 1170 generates the first and second switching control signals SW11 and SW12 having complementary logic levels to be provided to the first and second switching units 1130 and 1140, respectively.

Therefore, the first data I/O buffer unit 1150 provides the memory controller 20 with the first data DTA1 via the data pins 181 when the first chip selection signal CS0 is activated, and the first data I/O buffer unit 1150 provides the memory controller 20 with the other-data—being at least one of the second through fourth data DTA2~DTA4 when the first chip selection signal CS0 is not activated (deactivated).

The first delay unit 1221 delays the second data DTA2 by a first delay time $\Delta t12$ to be provided to the first switching unit 1230. The first switching unit 1230 selectively provides the second data DTA2 to the first data I/O buffer unit 1250 in response to a first switching control signal SW21. For example, when the second chip selection signal CS1 is activated, the first switching control signal SW21 is activated and the first switching unit 1230 provides the second data DTA2 to the first data I/O buffer unit 1250. When the first chip selection signal CS1 is not activated, the first switching control signal SW21 is not activated and the first switching unit 1230 does not provide the second data DTA2 to the first data I/O buffer unit 1150.

The second delay unit 1222 delays the other-data by a second delay time Δt22 to be provided to the second switching unit 1240. The second switching unit 1240 selectively provides the other-data to the first data I/O buffer unit 1250 in response to a second switching control signal SW22. For example, when the second chip selection signal CS1 is not activated, the second switching control signal SW22 is activated and the second switching unit 1240 provides the other-data to the first data I/O buffer unit 1250. When second chip selection signal CS1 is activated, the second switching control signal SW22 is not activated and the second switching unit 1240 does not provide the other-data to the first data I/O buffer unit 1250.

The switching signal generator 1270 generates the first and second switching control signals SW21 and SW22 having complementary logic levels to be provided to the first and second switching units 1230 and 1240 respectively.

Therefore, the first data I/O buffer unit 1250 provides the memory controller 20 with the second data DTA2 via the second near data pins 183, the first far data pins 182 and the first near data pins 181 when the second chip selection signal CS 1 is activated, and the first data I/O buffer unit 1250 provides the memory controller 20 with the other-data, one of the third and fourth data DTA3 and DTA4, via the second near data pins 183, the first far data pins 182 and the first near data pins 181, when the second chip selection signal CS1 is not activated (deactivated).

Configuration and operation of each of the third and fourth PTACs 1320 and 1420 are substantially the same as configuration and operation of each of the first and second PTACs 1120 and 1220.

Figure 4:
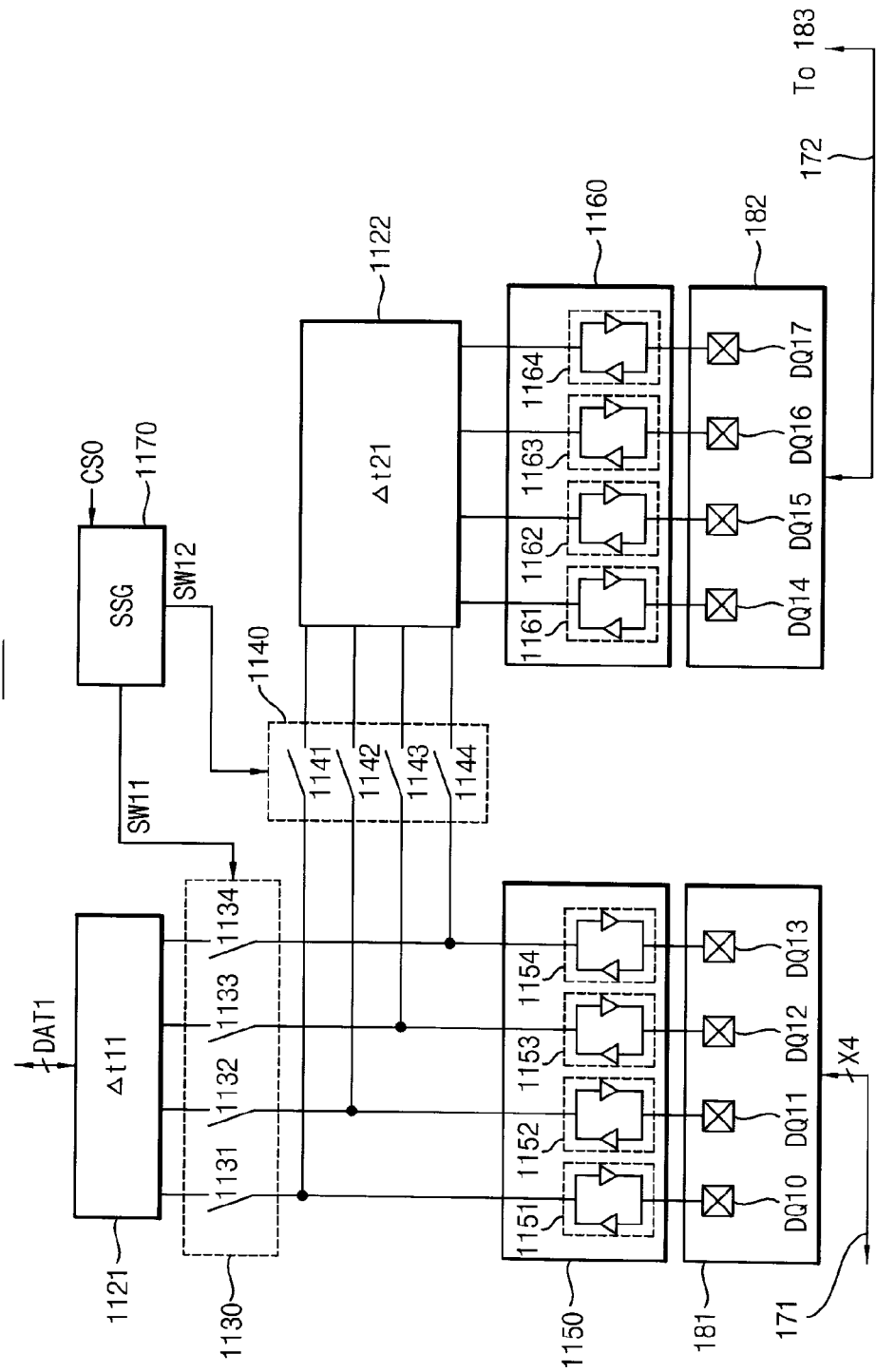
FIG. 4 is a circuit diagram illustrating an example of the first PTAC in FIG. 3.

FIG. 4 is a circuit diagram further illustrating in one example the first PTAC 1120 of FIG. 3.

Referring to FIG. 4, the first switching unit 1130 includes a plurality of first switches 1131~1134 that are switched in response to the first switching control signal SW11. The first data I/O buffer unit 1150 includes a plurality of first I/O buffers 1151~1154. The second switching unit 1140 includes a plurality of second switches 1141~1144 that are switched in response to the second switching control signal SW 12. In addition, the second data I/O buffer unit 1160 includes a plurality of second I/O buffers 1161~1164. Each of the first switches 1131~1134 is connected to the first delay unit 1121 and each of the first I/O buffers 1151~1154. Each of the first I/O buffers 1151~1154 is connected to each of data pins DQ10, DQ11, DQ12 and DQ13 respectively, and each of the second I/O buffers 1161~1164 is connected to each of data pins DQ14, DQ15, DQ16 and DQ17 respectively.

When the first chip selection signal CS0 is activated, the first switching control signal SW11 is activated and the second switching control signal SW12 is deactivated. Accordingly, the first switches 1131~1134 are connected and the second switches 1141~1144 are disconnected. Therefore, the self-data (first data DTA1) is provided to the memory controller 20 via the first I/O buffers 1151~4154 and the data pins DQ10, DQ11, DQ12 and DQ13. When the first chip selection signal CS0 is deactivated, the first switching control signal SW11 is deactivated and the second switching control signal SW12 is activated. Accordingly, the first switches 1131~1134 are disconnected and the second switches 1141~1144 are connected. Therefore, the other-data is provided to the memory controller 20 via the second I/O buffers 1161~4164, the first I/O buffers 1151~4154 and the data pins DQ10, DQ11, DQ12 and DQ13.

In the embodiment illustrated in FIG. 4, the self-data and the other-data are assumed to include 4-bits respectively. That is, in the illustrated embodiment of FIG. 4 each of the memory devices 111, 121, 131, and 141 shown in FIG. 2 is assumed to provide ×8 bandwidth. However, explanation with reference to FIG. 4 is applicable when the numbers of the switches, the I/O buffers and the data pins are eight in case that the memory devices 111, 121, 131, and 141 shown in FIG. 2 is ×16 bandwidth.

Figure 5:
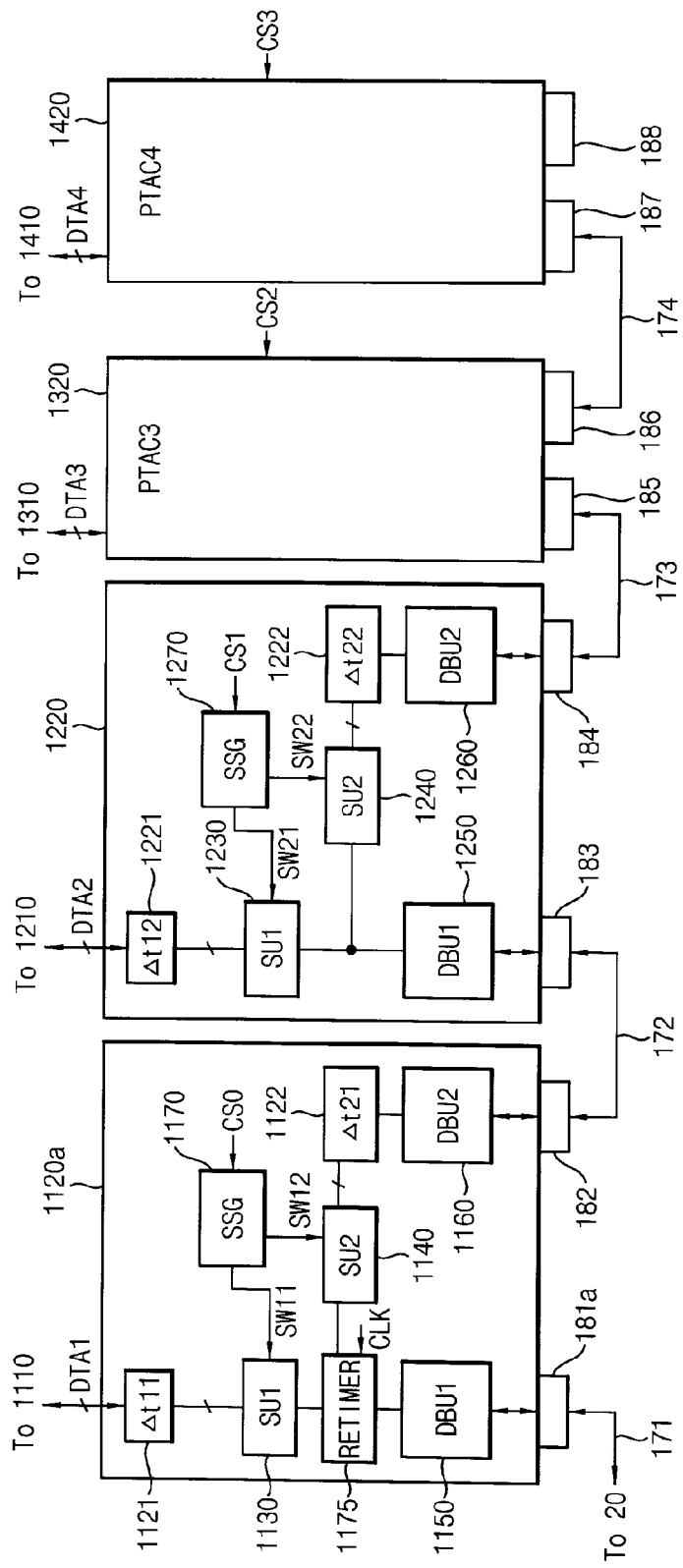
FIG. 5 is a block diagram illustrating an example of the PTAC in FIG. 2 according to an exemplary embodiment.

FIG. 5 is a block diagram illustrating in another example the various PTACs of FIG. 2 according to another embodiment of the inventive concept.

In FIG. 5, the first through PTACs 1120*a*, 1220, 1320 and 1420 are illustrated with only the first PTAC 1120*a* being particularly illustrated according to the working example.

Referring to FIG. 5, the first PTAC 1120*a* differs from the first PTAC 1120 of FIG. 3 in that the first PTAC 1120*a* further comprises a retimer 1175. In this regard, the further incorporation of a retimer may affect the numbers of the near data pins 181*a* and configuration and/or operation of the first I/O buffers in a first data I/O buffer unit 1150.

Within the first PTAC 1120*a*, the retimer 1175 is connected between the first switching unit 1130, the second switching unit 1140 and the first data I/O buffer unit 1150. The retimer 1175 temporally aligns the self-data (first data DTA1) retrieved from the first memory core 1110 with the other-data retrieved from some other memory core further down the column (e.g., one of the second through fourth data DTA2~DTA4). That is, the retimer 1175 may be used to synchronize output of either the self-data or other-data with a given clock signal CLK so as to provided synchronous output data to the first data I/O buffer unit 1150.

As noted above, the signal generator 1170 may be used to generate the first and second switching control signals SW11 and SW12 that are activated simultaneously and provided to the first and second switching units 1130 and 1140 respectively. In addition, the first data I/O buffer unit 1150 may include eight first I/O buffers and the data pins 181*a* may include eight data pins. The data pins 182 may include four data pins and the second data I/O buffer unit 1160 may include 4 second I/O buffers.

In this manner, the PTAC 1120*a* of FIG. 5 may align the first data DTA1 with the any one of the second through fourth data DTA2~DTA4 in synchronization with the clock signal CLK to thereby provide the memory controller 20 with the synchronous data via the near data pins 181*a*.

Figure 6:
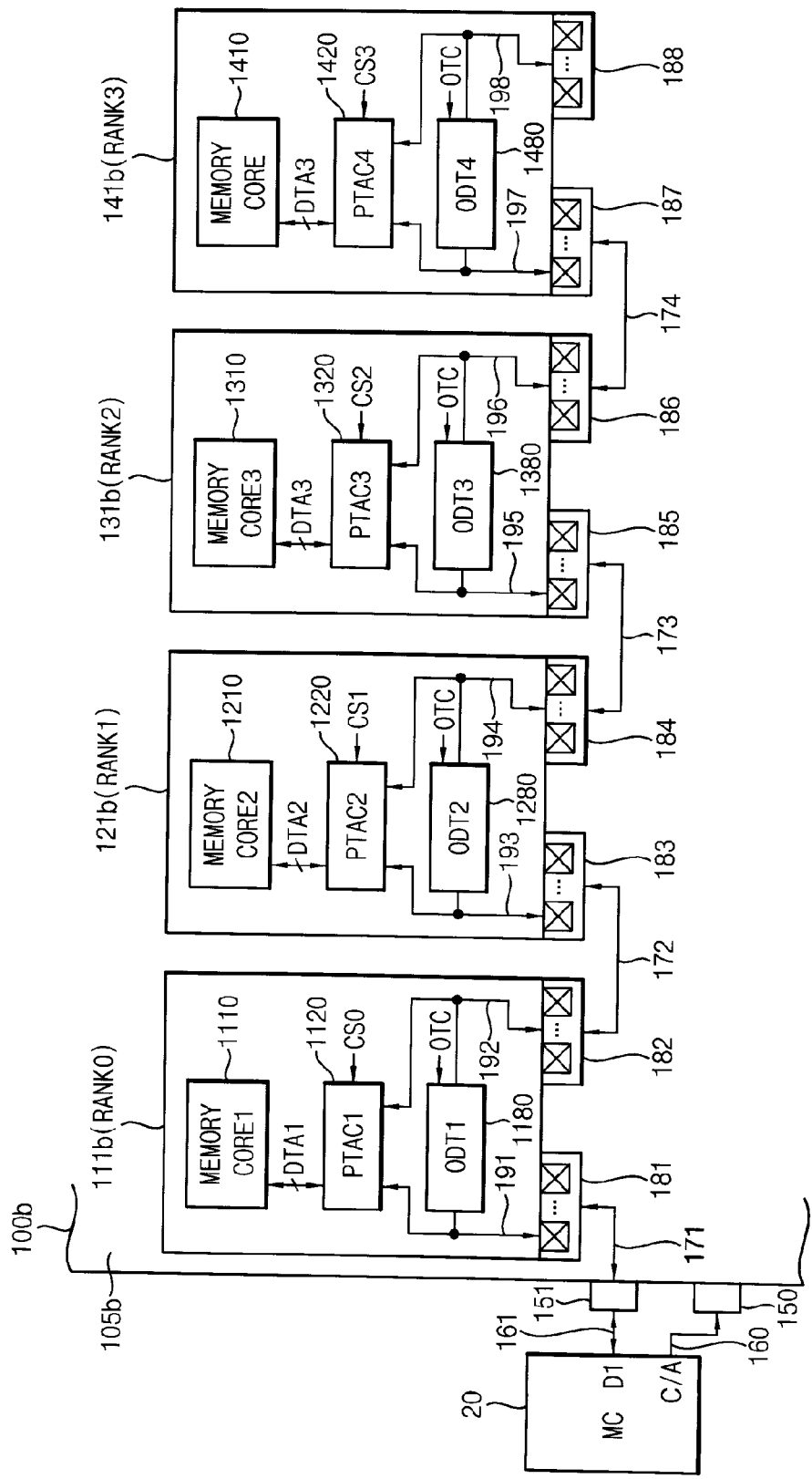
FIG. 6 illustrates how the memory devices in the memory module of FIG. 1 are connected according to an exemplary embodiment.

FIG. 6 is a block diagram illustrating operation of columnar memory devices arranged on a module board 105*b* of a memory module 100*b* according to another embodiment of the inventive concept.

Referring to FIG. 6, the memory module 100*b* is again assumed to include a plurality of memory devices 111*b*, 121*b* 131*b* and 141*b*. However, the memory devices 111*b*, 121*b*, 131*b* and 141*b* in the memory module 100*b* of FIG. 6 differ from the memory devices 111, 121, 131 and 141 in the memory module 100*a* of FIG. 2 in that the memory devices 111*b*, 121*b*, 131*b* and 141*b* include termination circuits 1180, 1280, 1380 and 1480 that may be used to terminate respective internal data bus segments 171, 172, 173 and 174 in response to a termination control signal OTC.

A first termination circuit 1180 of the first memory device 111b is connected between a first near data line 191 that connects the first PTAC 1120 with the first near data pins 181 and a first far data line 192 that connects the first PTAC 1120 with the first far data pins 182. Here, the first termination circuit 1180 may be used to terminate one or both of the first internal data bus segment 171 the second internal data bus segment 172 in response to the termination control signal OTC.

The second termination circuit 1280 of the second memory device 121b, the third termination circuit 1380 of the third memory device 131b, and the fourth termination circuit 1480 of the fourth memory device 141b are similarly disposed with respect to corresponding internal data bus segments.

Figure 7:
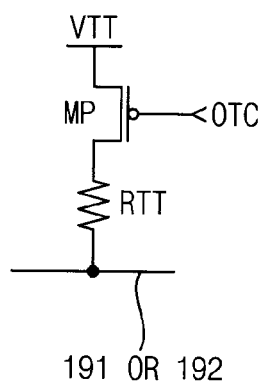
FIG. 7 illustrates an example of the first termination circuit in FIG. 7 according to an exemplary embodiment.

FIG. 7 is a circuit diagram illustrating in one example a first termination circuit that may be used in the termination circuits of FIG. 6 according to an embodiment of the inventive concept.

Referring to FIG. 7, the first termination circuit 1180 may include a termination resistor RTT and a p-channel metal-oxide semiconductor (PMOS) transistor MP. The PMOS transistor MP is connected between a termination voltage VTT and the termination resistor RTT and has a gate receiving the termination control signal OTC. The PMOS transistor MP may perform switching operation in response to the termination control signal OTC, and selectively provides the termination resistance to the data lines 191 and 192.

Each of the second through fourth termination circuits 1280, 1380 and 1480 may have substantially same configuration as the first termination circuit 1180.

Figure 8:
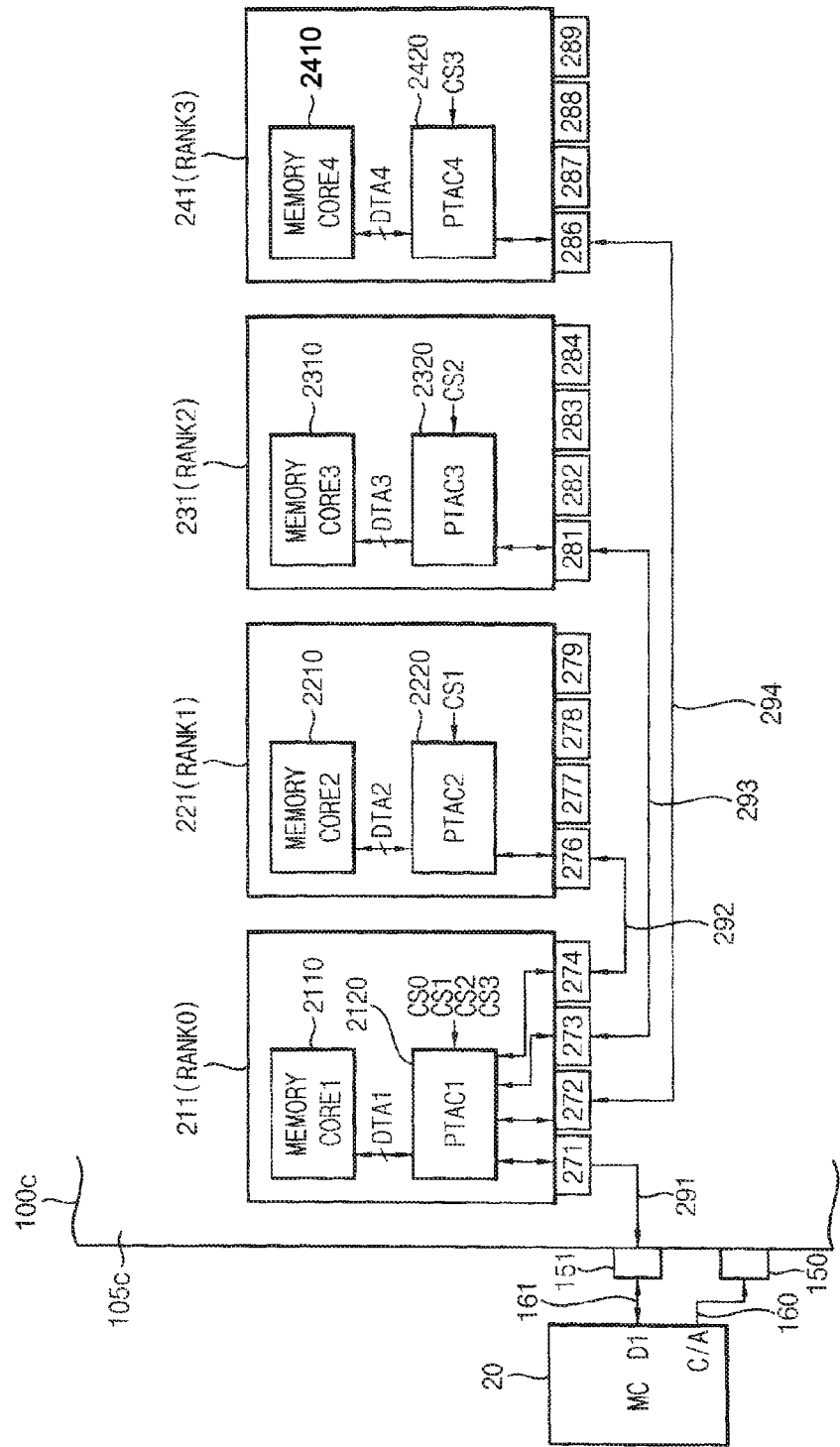
FIG. 8 illustrates how the memory devices in the memory module of FIG. 1 are connected according to an exemplary embodiment.

FIG. 8 is a block diagram illustrating operation of memory devices in a memory module such as the one shown in FIG. 1 according to another embodiment of the inventive concept.

Referring to FIG. 8, a memory module 100c include a plurality of memory devices 211, 221, 231 and 241 mounted on a module board 105c.

A first memory device 211 includes a first memory core 2110, a first PTAC 2120 and data pins 271, 272, 273 and 274. The first memory core 2110 stores first data DTA1. The first data DTA1 may be written to or read from the first memory core 2110. The first PTAC 2120 may selectively provide first data pins 271 with the first data DTA1 and/or one of the second through fourth data DTA2~DTA4 in response to chip selection signals CS0~CS3. The first data pins 271 are connected to the data port 151 via a first internal data bus segment 291.

As second memory device 221 includes a second memory core 2210, a second PTAC 2220 and data pins 276, 277, 278 and 279. The second memory core 2210 stores second data DTA2, and the second data DTA2 may be written to or read from the second memory core 2210. The second PTAC 2220 may selectively provide the second data DTA2 to first data pins 276 in response to the second chip selection signal CS1. The first data pins 276 are connected to the fourth data pins 274 of the first memory device 211 via a second internal data bus segment 292.

A third memory device 231 includes a third memory core 2310, a third PTAC 2320 and data pins 281, 282, 283 and 284. The third memory core 2310 stores third data DTA3, and the third data DTA3 may be written to or read from the third memory core 2310. The third PTAC 2320 may selectively provide the third data DTA3 to the first data pins 281 in response to a third chip selection signal CS2. The first data pins 281 of the third memory device 231 are connected to the third data pins 273 of the first memory device 211 via a third internal data bus segment 293.

A fourth memory device 241 includes a fourth memory core 2410, a fourth PTAC 2420 and data pins 286, 287, 288 and 289. The fourth memory core 2410 stores fourth data DTA4, and the fourth data DTA4 may be written to or read from the fourth memory core 2410. The fourth PTAC 2420 may selectively provide the fourth data DTA4 to first data pins 286 in response to a fourth chip selection signal CS3. The first data pins 286 of the fourth memory device 241 are connected to the second data pins 272 of the first memory device 211 via a fourth internal data bus segment 294.

Using the foregoing configuration in the memory module 100c of FIG. 8, the first memory device 211 may be used to select one of the first data DTA1 through the fourth data DTA2~DTA4 and transmit same to the memory controller 20 via the first data pins 271 and the data port 151. Thus, the first memory device 211 may be used as a column memory controller of sorts.

The memory module 100c in FIG. 8 differs from the memory module 100a in FIG. 2 in that the memory device 211 constituting first rank RANK0 is connected to all memory devices 211, 231 and 241 in the second set. The first PTAC 2120 may receive the first through fourth chip selection signals CS0~CS3.

For example, when the first chip selection signal CS0 is activated, the first data DTA1 is provided to the memory controller 20 via the data pins 271 and the data port 151. When the second chip selection signal CS1 is activated, the second data DTA2 is provided to the memory controller 20 via the data pins 276, 274 and 271 and the data port 151. When the third chip selection signal CS2 is activated, the third data DTA3 is provided to the memory controller 20 via the data pins 281, 273 and 271 and the data port 151. When the fourth chip selection signal CS3 is activated, the fourth data DTA4 is provided to the memory controller 20 via the data pins 286, 272 and 271 and the data port 151.

The data pins 271~274, 276~279, 281~284 and 286~289 in FIG. 8 may have ×4 or ×8 configuration. That is, when each of the data pins 271~274, 276~279, 281~284 and 286~289 ×4 configuration, each of the memory devices 211, 221, 231, 241 have ×8 bandwidth and the memory module 100c may have 4-rank configuration with ×4 bandwidth. When each of the data pins 271~274, 276~279, 281~284 and 286~289 have ×8 configuration, each of the memory devices 211, 221, 231, 241 have ×32 bandwidth and the memory module 100c may have 4-rank configuration with ×8 bandwidth.

The memory controller 20 must be able bear only the loading of the first memory device 211 in first rank RANK0 when the memory controller 20 transmits/receives data. Therefore, the memory module 100c may include an expanded number of ranks without necessarily reducing operating speed of the memory system.

Each of the memory devices 211, 221, 231 and 241 may incorporate a termination circuit like the one previously described with reference to FIG. 6.

Figure 9:
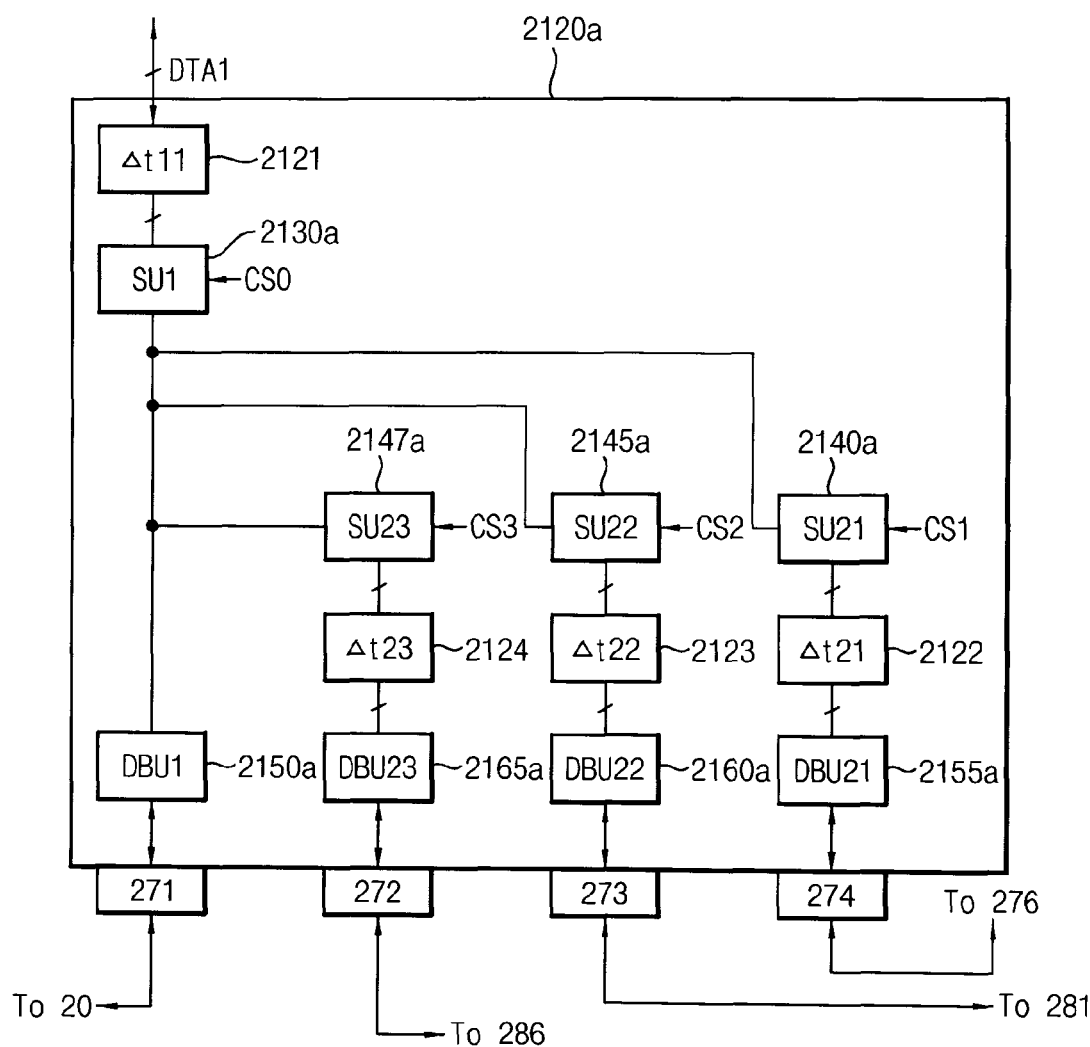
FIG. 9 is a block diagram illustrating an example of the first PTAC in FIG. 8 according to an exemplary embodiment.

FIG. 9 is a block diagram further illustrating in one example the first PTAC 2120 of FIG. 8 according to an embodiment of the inventive concept.

Referring to FIG. 9, the first PTAC 2120a includes first through fourth delay unit 2121~2124, first through fourth switching units 2130a, 2140a, 2145a and 2147a and first through fourth data I/O buffer units 2150a, 2155a, 2160a and 2165a.

The first delay unit 2121 delays the first data DTA1 by a first delay time Δt11 to be provided to the first switching unit 2130a. The first switching unit 2130a selectively provides the first data DTA1 to the first data I/O buffer unit 2150a in response to the first chip selection signal CS0.

The second switching unit 2140a selectively provides the first data I/O buffer unit 2150a with the second data DTA2 from the second memory core 2210, which goes through the data pins 274 and the second delay unit 2122 having a second delay time Δt21, in response to the second chip selection signal CS 1.

The third switching unit 2145a selectively provides the first data I/O buffer unit 2150a with the third data DTA3 from the third memory core 2310, which goes through the data pins 273 and the third delay unit 2123 having a third delay time Δt22, in response to the third chip selection signal CS2.

The fourth switching unit 2147a selectively provides the first data I/O buffer unit 2150a with the fourth data DTA4 from the fourth memory core 2410, which goes through the data pins 272 and the fourth delay unit 2124 having a fourth delay time Δt23, in response to the fourth chip selection signal CS3.

Each of the first through fourth switching units 2130a, 2140a, 2145a and 2147a may have substantially same configuration as the first switching unit 1130 in FIG. 4, and each of the first through fourth data I/O buffer units 2150a, 2155a, 2160a and 2165a may have substantially same configuration as the first data I/O buffer unit 1150 in FIG. 4.

Therefore, the memory device 211, directly connected to the memory controller 20, may provide the memory controller 20 with one of the first through fourth data DTA1~DTA4 in response to the chip selection signals CS0~CS3.

Figure 10:
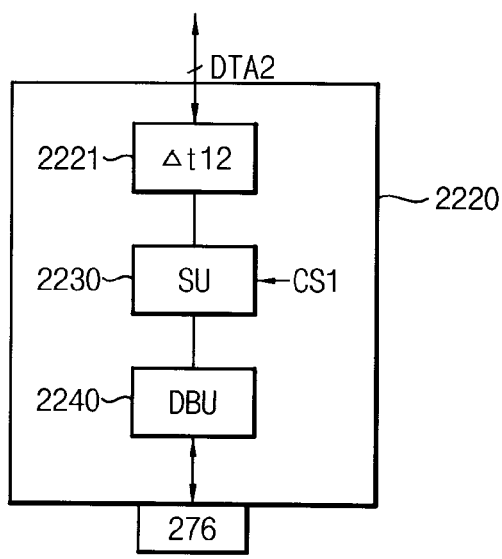
FIG. 10 is a block diagram illustrating an example of the second PTAC in FIG. 8 according to an exemplary embodiment.

FIG. 10 is a block diagram further illustrating in one example the second PTAC 2220 of FIG. 8 according to an embodiment of the inventive concept.

Referring to FIG. 10, the second PTAC 2220 includes a delay unit 2221, a switching unit 2230 and a data I/O buffer unit 2240. The delay unit 2221 delays the second data DTA2 by a delay time Δt12 to be provided to the switching unit 2230. The switching unit 2230 selectively provides the data I/O buffer unit 2240 with the second data DTA2 from the second memory core 2210 in response to the second chip selection signal CS1. The data I/O buffer unit 2240 is connected to the data pins 276. When the second chip selection signal CS1 is activated, the second data DTA2 is provided to the memory controller 20 via the data I/O buffer unit 2240, the data pins 276 and 274, the first data I/O buffer unit 2150a and the data pins 271.

Figure 11:
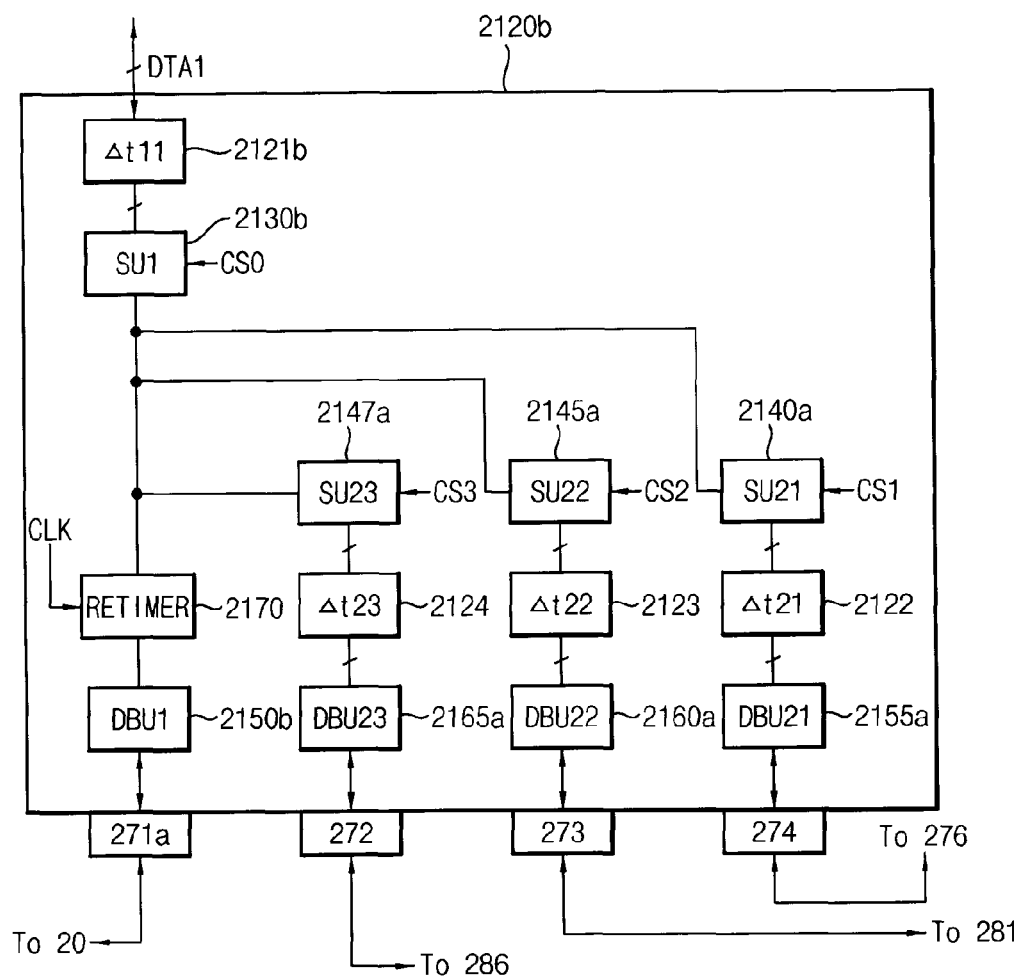
FIG. 11 is a block diagram illustrating an example of the first PTAC in FIG. 8 according to an exemplary embodiment.

FIG. 11 is a block diagram further illustrating in one example the first PTAC 2120b of FIG. 8 according to an embodiment of the inventive concept.

Referring to FIG. 11, the first PTAC 2120b differs from the first PTAC 2120a in FIG. 9 in that the first PTAC 2120b further includes a retimer 2170 and the numbers of the data pins 271a and the first I/O buffers in a first data I/O buffer unit 2150b.

The first PTAC 2120b may further include the retimer 2170 connected between the first through fourth switching units 2130b, 2140a, 2145a, 2147a, and the first data I/O buffer unit 2150b. The retimer 2170 aligns two of the first through fourth data DTA1~DTA4 in synchronization with a clock signal CLK, and provides the aligned data to the first data I/O buffer unit 2150b. Two of the first through fourth chip selection signals CS0~CS3 mat be activated simultaneously. In addition, the first data I/O buffer unit 2150b may include eight first I/O buffers and the data pins 271a may include eight data pins. Each of the data pins 272, 273 and 274 may include four data pins.

Figure 12:
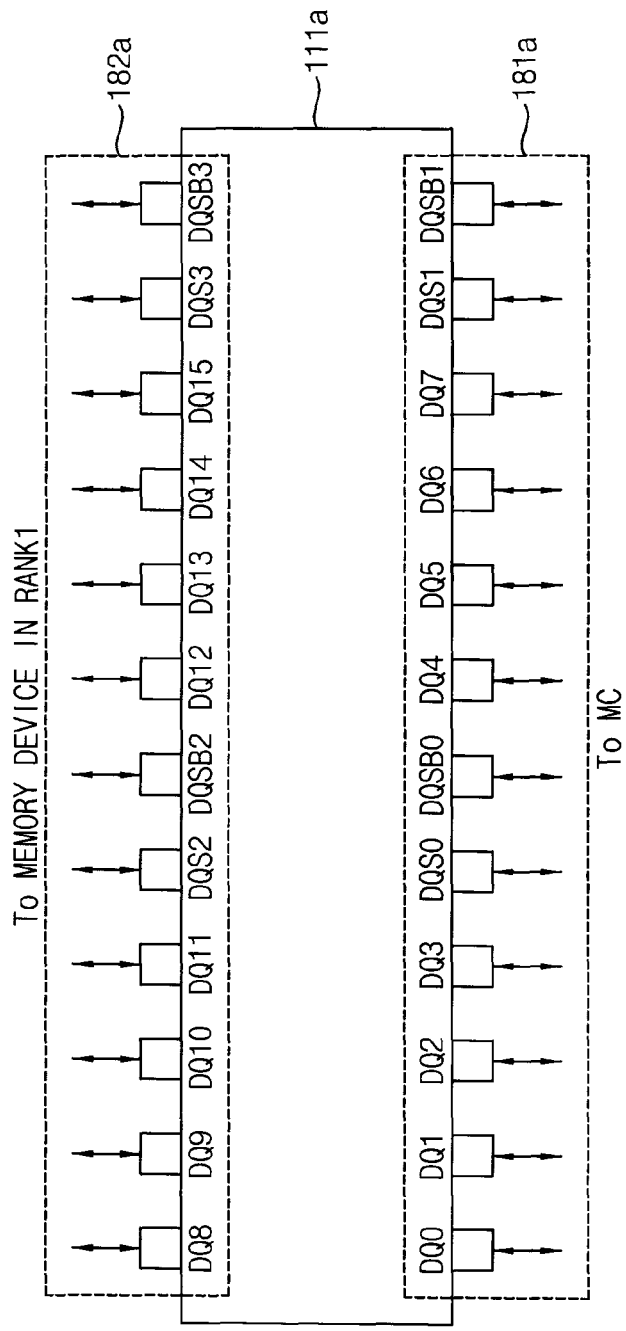
FIG. 12 illustrates arrangement of the pins of the first memory device in the memory module of FIG. 2 according to an exemplary embodiment.

FIG. 12 is a block diagram illustrating one possible arrangement of pins for a first rank memory device of the memory module of FIG. 2 according to certain embodiments of the inventive concept.

Referring to FIG. 12, a first memory device 111a like the first memory device 111 of FIG. 2 may directly be connected to the memory controller 20 includes a plurality of data pins DQ0~DQ15 and a plurality of data strobe pins DQS0, DQSB0, DQS1, DQSB1, DQS2, DQSB2, DQS3 and DQSB3.

FIG. 12 illustrates a case that a memory device having ×8 bandwidth is implemented with a memory device having ×16 bandwidth. In this case, the data pins DQ0~DQ7 and the data strobe pins DQS0, DQSB0, DQS1 and DQSB1 (reference numeral 181a) are connected to the memory controller 20 and the data pins DQ8~DQ15 and the data strobe pins DQS2, DQSB2, DQS3 and DQSB3 (reference numeral 182a) are connected to the memory device 121 in a second rank RANK1.

Figure 13:
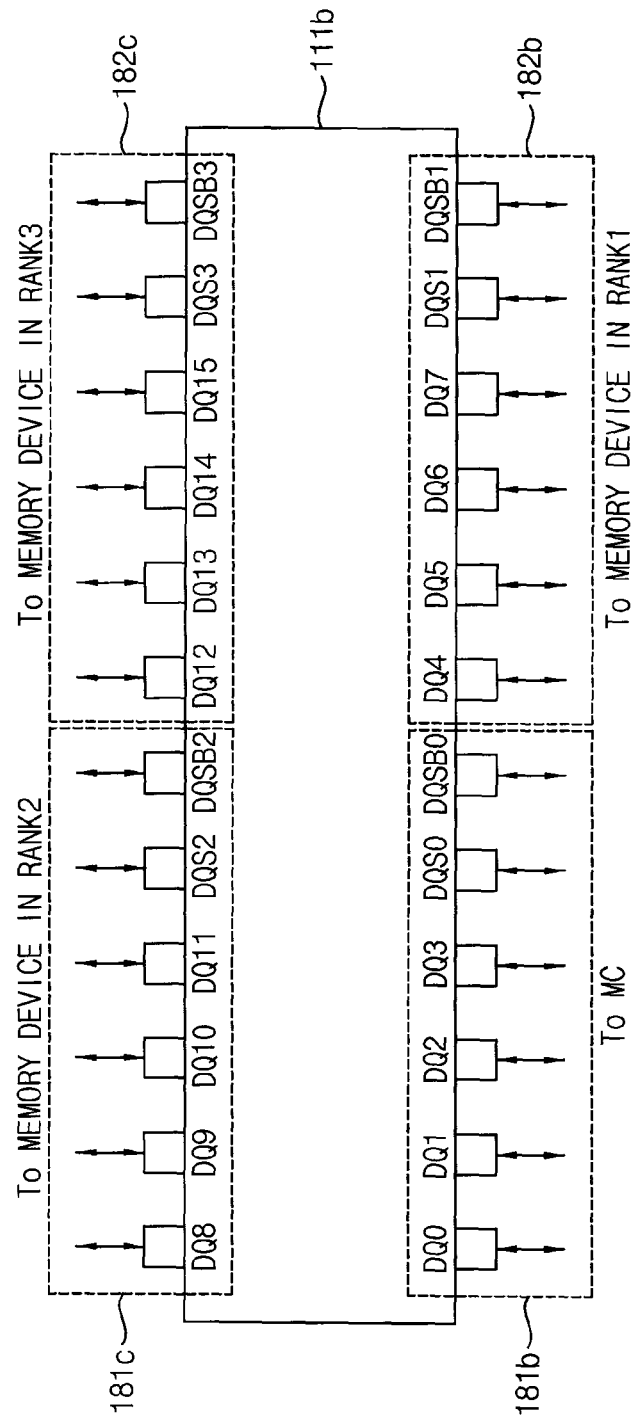
FIG. 13 illustrates arrangement of the pins of the first memory device in the memory module of FIG. 2 according to an exemplary embodiment.

FIG. 13 is a block diagram illustrating another possible arrangement of pins of a first rank memory device of the memory module of FIG. 2 according to certain embodiments of the inventive concept.

Referring to FIG. 13, a first memory device 111b may be directly connected to the memory controller 20 includes a plurality of data pins DQ0~DQ15 and a plurality of data strobe pins DQS0, DQSB0, DQS1, DQSB1, DQS2, DQSB2, DQS3 and DQSB3.

FIG. 13 illustrates a case that a memory device having ×4 bandwidth is implemented with a memory device having ×16 bandwidth. In this case, the data pins DQ0~DQ3 and the data strobe pins DQS0, DQSB0 represented by reference numeral 181b is connected to the memory controller 20, the data pins DQ4~DQ7 and the data strobe pins DQS1, DQSB1 represented by reference numeral 182b is connected to the memory device 121 in the second rank RANK1, the data pins DQ8~DQ11 and the data strobe pins DQS2, DQSB2 represented by reference numeral 181c is connected to the memory device 131 in a third rank RANK2, and the data pins DQ12~DQ15 and the data strobe pins DQS3, DQSB3 represented by reference numeral 182c is connected to the memory device 141 in a fourth rank RANK3. The arrangement of the pins of the first memory device 111b of FIG. 12 may be applicable to the memory module 100a in FIG. 2.

FIGS. 14,15,16,17 and 18 are respective block diagrams variously illustrating memory systems according to certain embodiments of the inventive concept.

Figure 14:
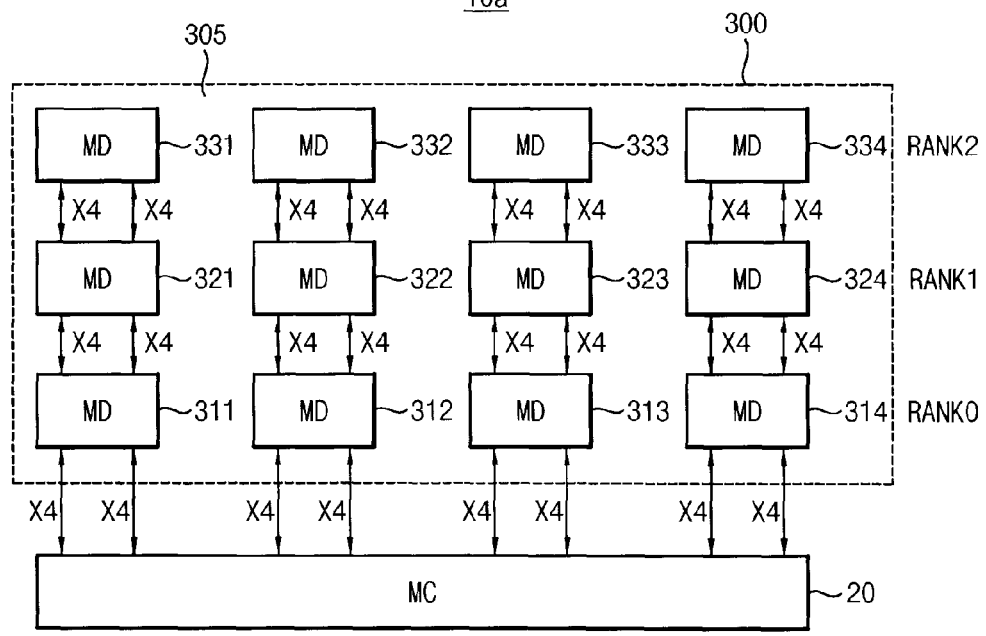
FIG. 14 is a block diagram illustrating a memory system according to an exemplary embodiment.

Referring to FIG. 14, a memory system 10a includes a memory controller 20 and a memory module 300.

The memory module 300 include a plurality of memory devices 311~314, 321~324 and 331~334 mounted on a module board 305. The memory module 300 has a multi-rank architecture. The memory devices 311~314 constitute a first rank RANK0, the memory devices 321~324 constitute a second rank RANK1, and the memory devices 331~334 constitute a third rank RANK2. Each of the memory devices 311~314 in a first rank RANK0 transmits/receives ×8-bandwidth data to/from the memory controller 20, each of the memory devices 321~324 in a second rank RANK1 transmits/receives data to/from the memory controller 20 through the associated one of the memory devices 311~314 in a first rank RANK0 and each of the memory devices 331~334 in a third rank RANK2 transmits/receives data to/from the memory controller 20 through the associated one of the memory devices 321~324 in a second rank RANK1 and the associated one of the memory devices 311~314 in a first rank RANK0.

FIG. 14 illustrates a case that a memory module with ×8 bandwidth and three rank is implemented with memory devices having ×16 bandwidth. In addition, the memory devices 311~314, 321~324 and 331~334 may employ the PTACs 1120, 1220, 1320 and 1420 in FIG. 3 respectively.

Figure 15:
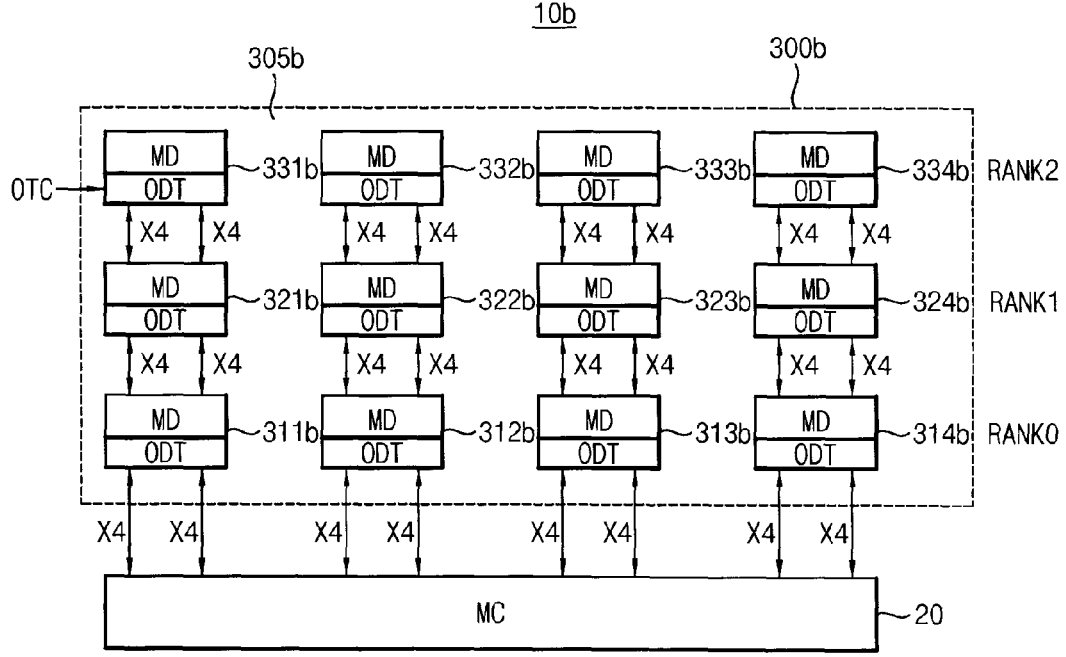
FIG. 15 is a block diagram illustrating a memory system according to an exemplary embodiment.

Referring to FIG. 15, a memory system 10b includes a memory controller 20 and a memory module 300b.

The memory module 300b include a plurality of memory devices 311b~314b, 321b~324b and 331b~334b mounted on a module board 305b. The memory module 300b has a multi-rank architecture. The memory devices 311b~314b constitute a first rank RANK0, the memory devices 321b~324b constitute a second rank RANK1, and the memory devices 331b~334b constitute a third rank RANK2. Each of the memory devices 311b~314b in a first rank RANK0 transmits/receives ×8-bandwidth data to/from the memory controller 20, each of the memory devices 321b~324b in a second rank RANK1 transmits/receives data to/from the memory controller 20 through the associated one of the memory devices 311b~314b in a first rank RANK0 and each of the memory devices 331b~334b in a third rank RANK2 transmits/receives data to/from the memory controller 20 through the associated one of the memory devices 321b~324b in a second rank RANK1 and the associated one of the memory devices 311b~314b in a first rank RANK0.

FIG. 15 illustrates a case that a memory module with ×8 bandwidth and three rank is implemented with memory devices having ×16 bandwidth. In addition, the memory devices 311b~314b, 321b~324b and 331b~334b may be connected as the memory devices 111, 121, 131 and 141 in FIG. 2. In addition, each of the memory devices 311b~314b, 321b~324b and 331b~334b may include a termination circuit ODT which is individually controlled in response to a termination control signal OTC to provide a termination resistance to associated data lines.

Figure 16:
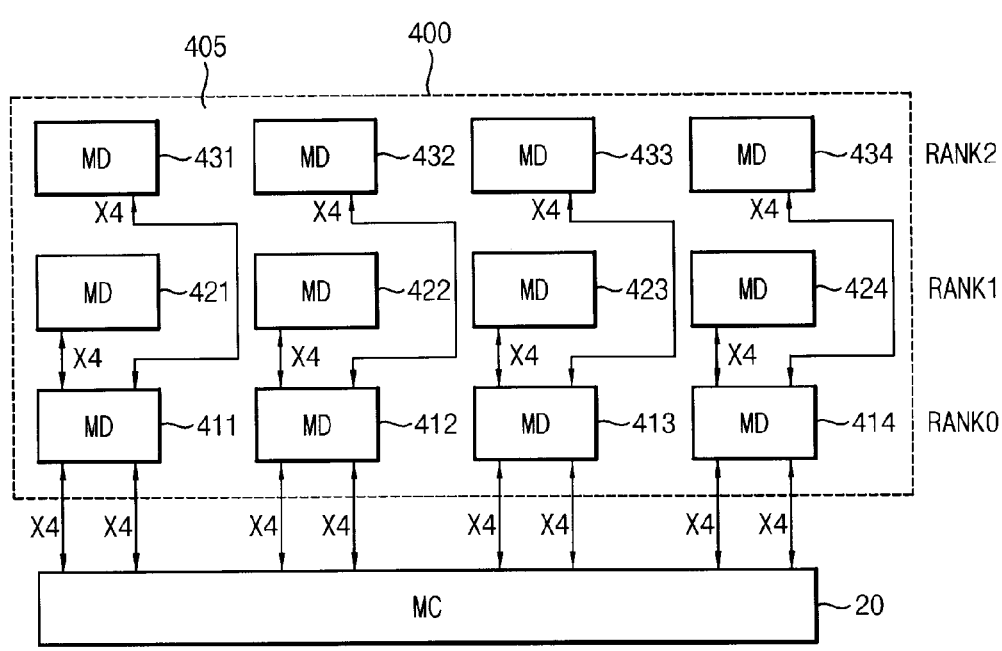
FIG. 16 is a block diagram illustrating a memory system according to an exemplary embodiment.

Referring to FIG. 16, a memory system 10c includes a memory controller 20 and a memory module 400.

The memory module 400 include a plurality of memory devices 411~414, 421~424 and 431~434 mounted on a module board 405. The memory module 400 has a multi-rank architecture. The memory devices 411~414 constitute a first rank RANK0, the memory devices 421~424 constitute a second rank RANK1, and the memory devices 431~434 constitute a third rank RANK2. Each of the memory devices 411~414 in a first rank RANK0 transmits/receives ×8-bandwidth data to/from the memory controller 20, each of the memory devices 421~424 in a second rank RANK1 transmits/receives data to/from the memory controller 20 through the associated one of the memory devices 411~414 in a first rank RANK0 and each of the memory devices 431~434 in a third rank RANK2 transmits/receives data to/from the memory controller 20 through the associated one of the memory devices 411~414 in a first rank RANK0.

FIG. 16 illustrates a case that a memory module with ×8 bandwidth and three rank is implemented with memory devices having ×16 bandwidth. In addition, the memory devices 411~414, 421~424 and 431~434 may employ the PTACs 1120a, 1220a, 1320a and 1420a in FIG. 5 respectively. Each of the memory devices 411~414 in a first rank RANK0 may provide the memory controller 20 with self-data and other-data corresponding to one of data from the memory device in a second rank and data from the memory device in a third rank.

Figure 17:
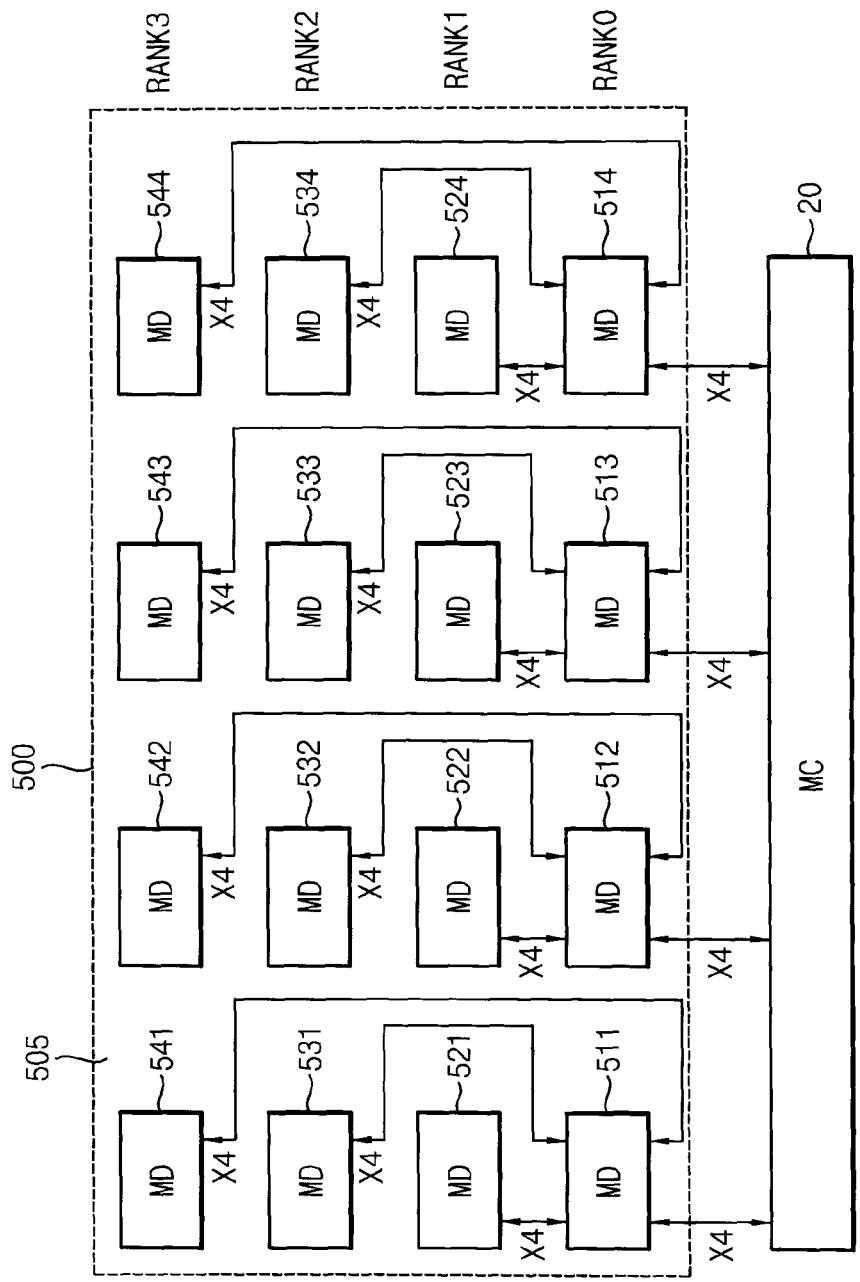
FIG. 17 is a block diagram illustrating a memory system according to an exemplary embodiment.

Referring to FIG. 17, a memory system 10d includes a memory controller 20 and a memory module 500.

The memory module 500 include a plurality of memory devices 511~514, 521~524, 531~534 and 541~544 mounted on a module board 505. The memory module 500 has a multi-rank architecture. The memory devices 511~514 constitute a first rank RANK0, the memory devices 521~524 constitute a second rank RANK1, the memory devices 531~534 constitute a third rank RANK2, and the memory devices 541~544 constitute a fourth rank RANK3. Each of the memory devices 511~514 in a first rank RANK0 transmits/receives ×4-bandwidth data to/from the memory controller 20, each of the memory devices 521~524 in a second rank RANK1 transmits/receives data to/from the memory controller 20 through the associated one of the memory devices 511~514 in a first rank RANK0, each of the memory devices 531~534 in a third rank RANK2 transmits/receives data to/from the memory controller 20 through the associated one of the memory devices 511~514 in a first rank RANK0, and each of the memory devices 541~544 in a fourth rank RANK3 transmits/receives data to/from the memory controller 20 through the associated one of the memory devices 511~514 in a first rank RANK0.

FIG. 17 illustrates a case that a memory module with ×4 bandwidth and four rank is implemented with memory devices having ×16 bandwidth. In addition, the memory devices 511~514, 521~524, 531~534 and 541~544 may employ the PTACs 2120, 2220, 2320 and 2420 in FIG. 8 respectively.

Figure 18:
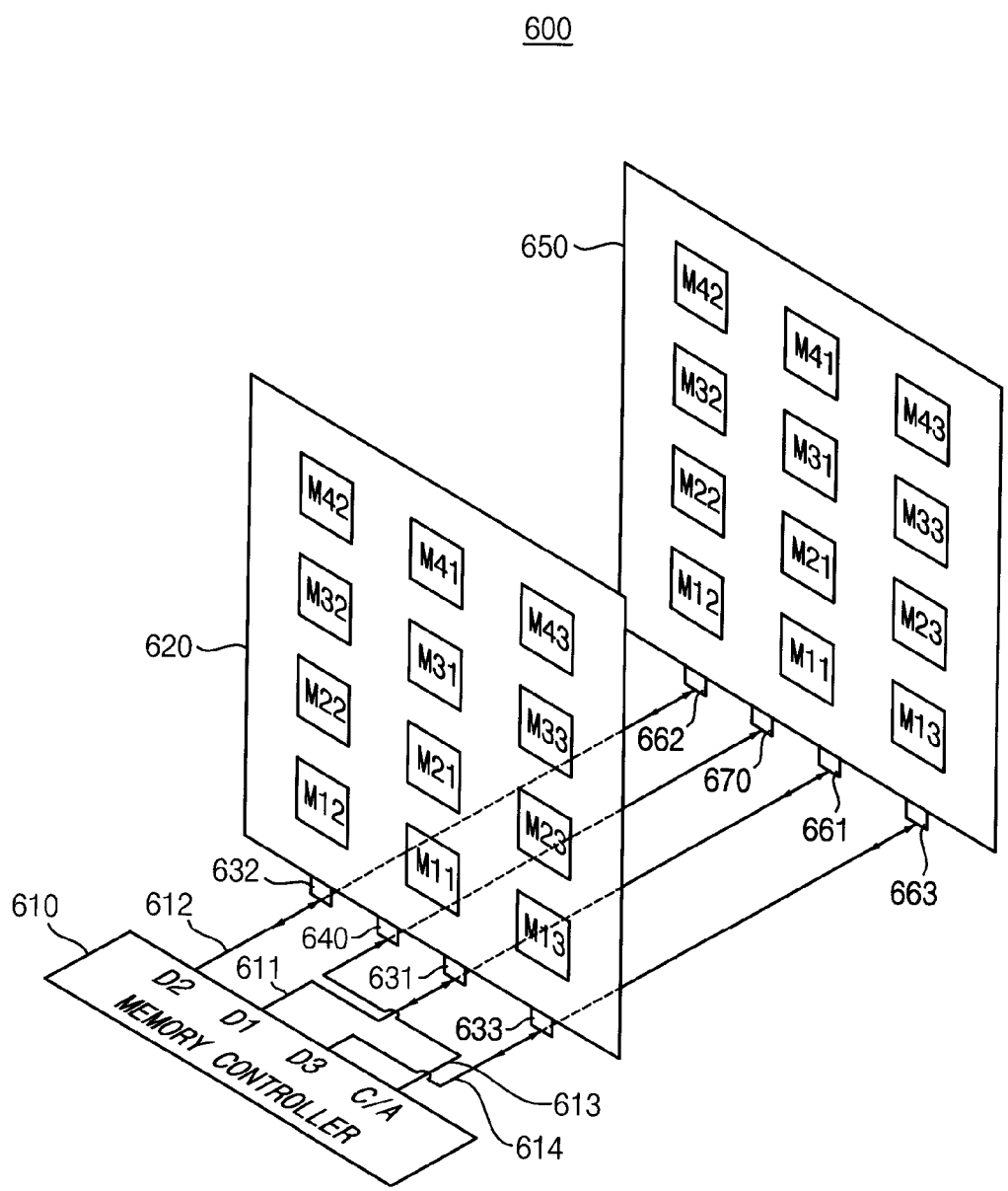
FIG. 18 is a block diagram illustrating a memory system according to an exemplary embodiment.

Referring to FIG. 18, a memory system 600 includes a memory controller 610, a first memory module 620 and a second memory module 650. The first and second memory modules 620 and 650 respectively include a plurality of memory devices M11, M12, M13, M21, M22, M23, M31, M32, M33, M41, M42, and M43, similar to the memory module 100 of FIG. 1.

Data ports D1, D2, and D3 of the memory controller 610 are respectively connected to data ports 631, 632, and 633 of the first memory module 620 and to data ports 661, 662, and 663 of the second memory module 650 through data buses 611, 612, and 613. A C/A port of the memory controller 610 is respectively connected to a C/A port 640 of the first memory module 620 and a C/A port 670 of the second memory module 650 via a C/A bus 614.

Although in FIG. 18 the first and second memory modules 620 and 650 are connected to the memory controller 610 via the same data buses 611, 612, and 613 and C/A bus 614, in other embodiments of the inventive concept, the first and second memory module 620 and 650 may be connected to the memory controller 610 via physically separate data buses and/or C/A buses.

The memory modules described with reference to FIGS. 2, 3, 4, 5, 6, 7, 8, 9, 10, 11, 12, 13, 14, 15, 16, and 17 (hereafter, "FIGS. 2 through 17") may be respectively employed in the first and second memory modules 620 and 650.

In addition, the various PTAC described with reference to FIGS. 2, 3, 4, 5, 6, 7, 8, 9, 10, and 11 may be respectively employed in the first and second memory modules 620 and 650. In this case, the second memory module 650 may transmit/receive data to/from a PTAC in the first memory module 620 in response to a module selection signal. That is, the PTAC in the first memory module 620 may provide the memory controller 610 with one of self data from the first memory module 620 and other data from the second memory module 650 in response to the module selection signal.

Figure 19:
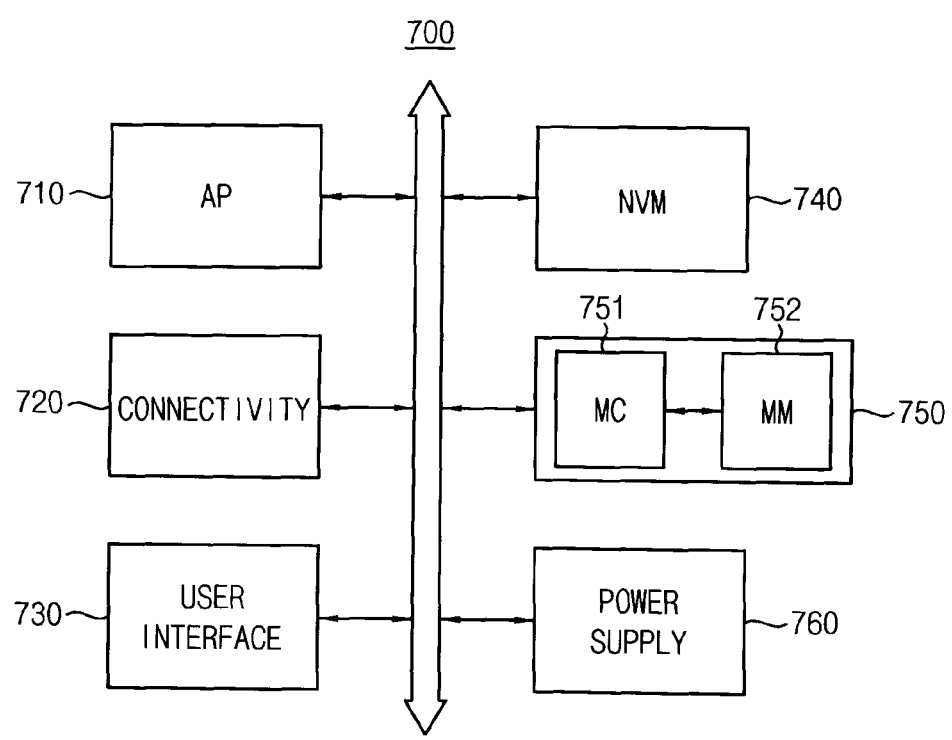
FIG. 19 is a block diagram illustrating a mobile system including the memory module according to an exemplary embodiment.

FIG. 19 is a general block diagram illustrating a mobile system that may incorporate a memory module according to an embodiment of the inventive concept.

Referring to FIG. 19, a mobile system 700 includes an application processor 710, a connectivity unit 720, a user interface 730, a nonvolatile memory device 740, a memory sub-system 750, and a power supply 760. In certain embodiments, the mobile system 700 may be a mobile phone, a smart phone, a personal digital assistant (PDA), a portable multimedia player (PMP), a digital camera, a music player, a portable game console, a navigation system, etc.

The application processor 710 may execute applications, such as a web browser, a game application, a video player, etc. In certain embodiments, the application processor 710 may include a single core or multiple cores. For example, the application processor 710 may be a multi-core processor, such as a dual-core processor, a quad-core processor, a hexa-core processor, etc. The application processor 710 may include an internal or external cache memory.

The connectivity unit 720 may perform wired or wireless communication with an external device. For example, the connectivity unit 720 may perform Ethernet communication, near field communication (NFC), radio frequency identification (RFID) communication, mobile telecommunication, memory card communication, universal serial bus (USB) communication, etc. In certain embodiments, the connectivity unit 720 may include a baseband chipset that supports communications, such as global system for mobile communications (GSM), general packet radio service (GPRS), wideband code division multiple access (WCDMA), high speed downlink/uplink packet access (HSxPA), etc.

The memory sub-system 750 may store data processed by the application processor 710, or may operate as a working memory. The memory sub-system 750 includes a memory controller 751 and a memory module 752. The memory module 752 may employ one of the memory modules explained with reference to FIGS. 2 through 17. The memory module 752 includes a first set of memory devices in a first rank, directly connected to the memory controller 751 and a second set of memory devices in at least a second rank, each connected to the memory controller 751 via associated one of the memory devices of the first set. Therefore, the memory controller 751 need only bear the loading of the memory device in a first rank when the memory controller 751 transmits/receives data. Therefore, the memory module 752 may include an increased number of ranks without necessarily reducing operating speed of the memory system.

The nonvolatile memory device 740 may store a boot image for booting the mobile system 700. For example, the nonvolatile memory device 740 may be an electrically erasable programmable read-only memory (EEPROM), a flash memory, a phase change random access memory (PRAM), a resistance random access memory (RRAM), a nano floating gate memory (NFGM), a polymer random access memory (PoRAM), a magnetic random access memory (MRAM), a ferroelectric random access memory (FRAM), etc.

The user interface 730 may include at least one input device, such as a keypad, a touch screen, etc., and at least one output device, such as a speaker, a display device, etc. The power supply 760 may supply a power supply voltage to the mobile system 700. In some embodiments, the mobile system 700 may further include a camera image processor (CIS), and/or a storage device, such as a memory card, a solid state drive (SSD), a hard disk drive (HDD), a CD-ROM, etc.

In certain embodiments, the mobile system 700 and/or components of the mobile system 700 may be packaged in various forms, such as package on package (PoP), ball grid arrays (BGAs), chip scale packages (CSPs), plastic leaded chip carrier (PLCC), plastic dual in-line package (PDIP), die in waffle pack, die in wafer form, chip on board (COB), ceramic dual in-line package (CERDIP), plastic metric quad flat pack (MQFP), thin quad flat pack (TQFP), small outline IC (SOIC), shrink small outline package (SSOP), thin small outline package (TSOP), system in package (SIP), multi chip package (MCP), wafer-level fabricated package (WFP), or wafer-level processed stack package (WSP).

FIG. 20 is a general block diagram illustrating a computing system that may incorporate a memory module according to an embodiment of the inventive concept.

Referring to FIG. 20, a computing system 800 includes a processor 810, an input/output hub (IOH) 820, an input/output controller hub (ICH) 830, at least one memory module 840 and a graphics card 850. In some embodiments, the computing system 800 may be a personal computer (PC), a server computer, a workstation, a laptop computer, a mobile phone, a smart phone, a personal digital assistant (PDA), a portable multimedia player (PMP), a digital camera), a digital television, a set-top box, a music player, a portable game console, a navigation system, etc.

The processor 810 may perform various computing functions, such as executing specific software for performing specific calculations or tasks. For example, the processor 810 may be a microprocessor, a central process unit (CPU), a digital signal processor, or the like. In some embodiments, the processor 810 may include a single core or multiple cores. For example, the processor 810 may be a multi-core processor, such as a dual-core processor, a quad-core processor, a hexa-core processor, etc. Although FIG. 20 illustrates the computing system 800 including one processor 810, in some embodiments, the computing system 800 may include a plurality of processors. The processor 810 may include an internal or external cache memory.

The processor 810 may include a memory controller 811 for controlling operations of the memory module 840. The memory controller 811 included in the processor 810 may be referred to as an integrated memory controller (IMC). The memory controller 811 may include structure and/or perform the methods of one or more of the embodiments described herein. A memory interface between the memory controller 811 and the memory module 840 may be implemented with a single channel including a plurality of signal lines, or may bay be implemented with multiple channels, to each of which at least one memory module 840 may be coupled. In some embodiments, the memory controller 811 may be located inside the input/output hub 820, which may be referred to as memory controller hub (MCH).

The memory module 840 may include a plurality of memory devices that store data provided from the memory controller 811. The memory module 840 may employ one of the memory modules explained with reference to FIGS. 2 through 17. The memory module 840 includes a first set of memory devices in a first rank, directly connected to the memory controller 811 and a second set of memory devices in at least a second rank, each connected to the memory controller 811 via associated one of the memory devices of the first set. Therefore, the memory controller 811 needs to bear a loading of the memory device in a first rank when the memory controller 811 transmits/receives data. Therefore, the memory module 840 may include an increased number of ranks without necessarily reducing operating speed of the memory system.

The input/output hub 820 may manage data transfer between processor 810 and devices, such as the graphics card 850. The input/output hub 820 may be coupled to the processor 810 via various interfaces. For example, the interface between the processor 810 and the input/output hub 820 may be a front side bus (FSB), a system bus, a HyperTransport, a lightning data transport (LDT), a Quick-Path interconnect (QPI), a common system interface (CSI), etc. Although FIG. 20 illustrates the computing system 800 including one input/output hub 820, in some embodiments, the computing system 800 may include a plurality of input/output hubs. The input/output hub 820 may provide various interfaces with the devices. For example, the input/output hub 820 may provide an accelerated graphics port (AGP) interface, a peripheral component interface-express (PCIe), a communications streaming architecture (CSA) interface, etc.

The graphics card 850 may be coupled to the input/output hub 820 via AGP or PCIe. The graphics card 850 may control a display device (not shown) for displaying an image. The graphics card 850 may include an internal processor for processing image data and an internal memory device. In some embodiments, the input/output hub 820 may include an internal graphics device along with or instead of the graphics card 850 outside the graphics card 850. The graphics device included in the input/output hub 820 may be referred to as integrated graphics. Further, the input/output hub 820 including the internal memory controller and the internal graphics device may be referred to as a graphics and memory controller hub (GMCH).

The input/output controller hub 830 may perform data buffering and interface arbitration to efficiently operate various system interfaces. The input/output controller hub 830 may be coupled to the input/output hub 820 via an internal bus, such as a direct media interface (DMI), a hub interface, an enterprise Southbridge interface (ESI), PCIe, etc. The input/output controller hub 830 may provide various interfaces with peripheral devices. For example, the input/output controller hub 830 may provide a universal serial bus (USB) port, a serial advanced technology attachment (SATA) port, a general purpose input/output (GPIO), a low pin count (LPC) bus, a serial peripheral interface (SPI), PCI, PCIe, etc.

In certain embodiments, the processor 810, the input/output hub 820 and the input/output controller hub 830 may be implemented as separate chipsets or separate integrated circuits. In other embodiments, at least two of the processor 810, the input/output hub 820 and the input/output controller hub 830 may be implemented as a single chipset.

As described above, only a first grouping of memory devices associated with a first rank of memory devices mounted on a memory module are directly connected to a memory controller, while a second grouping of memory devices including all other ranks are indirectly connected to the memory controller through a the first grouping of memory devices. Therefore, the memory controller need only bear the loading of the memory devices in the first grouping. Accordingly, the memory module may include relatively more ranks of memory devices without necessarily reducing operating speed.

The foregoing embodiments are illustrative. Although a few embodiments have been described above, those skilled in the art will readily appreciate that many modifications are possible to the embodiments without materially departing from the novel teachings and advantages of the present inventive concept. Accordingly, all such modifications are intended to be included within the scope of the inventive concept as defined by the following claims. Therefore, it is to be understood that the foregoing is illustrative of various example embodiments and is not to be construed as limited to the specific example embodiments disclosed, and that modifications to the disclosed example embodiments, as well as other example embodiments, are intended to be included within the scope of the appended claims.

What is claimed is:

1. A memory module comprising:
   memory devices arranged on a module board in a number of ranks and a number of columns and including a first grouping of the memory devices and a second grouping of the memory devices,
   the first grouping includes memory devices arranged only in a first rank among the ranks that is nearest a memory controller that controls execution of a read operation directed to the memory devices, the second grouping includes memory devices in all ranks other than the first rank, and only the memory devices of the first rank in the first grouping are each directly connected to the memory controller,
   the memory devices in the second grouping are each indirectly connected to the memory controller via a corresponding memory device in the first grouping arranged in a same column, and
   each of the memory devices in the first grouping are configured to selectively provide either self-data retrieved from a constituent memory core or other-data retrieved from a memory core of a memory device in the second grouping during the read operation.

2. The memory module of claim 1, further comprising:
   data ports equal in number to the number of columns, wherein the data ports are arranged in parallel between the memory devices and the memory controller.

3. The memory module of claim 1, wherein the second grouping comprises memory devices arranged in a second rank, a third rank and a fourth rank, such that each of the columns of the memory devices includes a first memory device in the first grouping and a second memory device, a third memory device and a fourth memory device in the second grouping.

4. The memory module of claim 3, wherein first near data pins of the first memory device are connected to a first data port via a first internal data bus segment,
   first far data pins of the first memory device are connected to second near data pins of the second memory device via a second internal data bus segment,
   second far data pins of the second memory device are connected to third near data pins of the third memory device via a third internal data bus segment, and
   third far data pins of the third memory device are connected to fourth near data pins of the fourth memory device via a fourth internal data bus segment,
   whereby the second memory device, third memory device and fourth memory device are indirectly connected to the memory controller through the first memory device.

5. The memory module of claim 4, wherein each one of the first memory device, the second memory device, the third memory device and the fourth memory device are respectively enabled to provide either the self-data or the other-data during the read operation by a corresponding one of a first chip selection signal, a second chip selection signal, a third chip selection signal and a fourth chip selection signal provided by the memory controller.

6. The memory module of claim 4, wherein the first memory device comprises a first termination circuit configured to terminate at least one of the first and second internal data bus segments in response to a termination control signal, the second memory device comprises a second termination circuit configured to terminate at least one of the second and third internal data bus segments in response to the termination control signal, and the third memory device comprises a third termination circuit configured to terminate at least one of the third and fourth internal data bus segments in response to the termination control signal.

7. The memory module of claim 6, wherein at least one of the first termination circuit, the second termination circuit, and the third termination circuit comprises:

a termination resistor and a p-channel metal-oxide semiconductor (PMOS) transistor, wherein the PMOS transistor is connected between a termination voltage and the termination resistor and has a gate that receives the termination control signal.

8. A memory module comprising:

memory devices arranged on a module board in a number of ranks and a number of columns and including a first grouping of the memory devices and a second grouping of the memory devices, the first grouping includes memory devices arranged in a first rank among the ranks that is nearest a memory controller that controls execution of a read operation directed to the memory devices, the memory devices in the first grouping are each directly connected to the memory controller, the memory devices in the second grouping are each indirectly connected to the memory controller via a corresponding memory device in the first grouping arranged in a same column, and each of the memory devices in the first grouping are configured to selectively provide either self-data retrieved from a constituent memory core or other-data retrieved from a memory core of a memory device in the second grouping during the read operation, wherein each of the memory devices in the first grouping comprises a first memory core configured to provide the self-data during the read operation; and a first path and timing adjusting circuit (PTAC) connected between the first memory core and first near data pins and first far data pins, wherein the first near data pins are configured to transmit either the self-data from the first memory core or other-data received by the first PTAC to the memory controller, and the first far data pins are configured to receive the other-data from at least one memory device in the second grouping.

9. The memory module of claim 8, wherein the at least one of the memory devices in the second grouping comprises:

a second memory core configured to provide the self-data during the read operation; and a second PTAC connected between the second memory core and second near data pins and second far data pins, wherein the second near data pins are configured to transmit either the self-data from the second memory core or other-data received by the second PTAC to a corresponding memory device in the first grouping, and the second far data pins are configured to receive the other-data from another memory device in the second grouping.

10. The memory module of claim 8, wherein the first PTAC comprises:

a first delay unit connected to the first memory core;

a first switching unit connected to the first delay unit, the first switching unit including a plurality of first switches configured to be switched in response to a first switching control signal;

a first data input/output (I/O) buffer unit connected between the first switching unit and the first near data pins;

a second switching unit connected to the first data I/O buffer unit, the second switching unit including a plurality of second switches configured to be switched in response to a second switching control signal;

a second delay unit connected to the second switching unit;

a second data I/O buffer unit connected between the second delay unit and the first far data pins; and a switching signal generator configured to provide the first and second switching control signals in response to a chip selection signal, wherein the first PTAC is configured to provide either the self-data or the other-data to the memory controller in response to the first and second switching control signals.

11. The memory module of claim 8, wherein the first PTAC comprises:

a first delay unit connected to the first memory core;

a first switching unit connected to the first delay unit, the first switching unit including a plurality of first switches configured to be switched in response to a first switching control signal;

a second data input/output (I/O) buffer unit connected to the first far data pins;

a second switching unit connected to the second data I/O buffer unit, the second switching unit including a plurality of second switches configured to be switched in response to a second switching control signal;

a retimer connected between the first and second switching units, wherein the retimer is configured to synchronously align the self-data or the other-data output to the memory controller with a clock signal during the read operation;

a first data I/O buffer unit connected between the retimer and the first near data pins; and a switching signal generator configured to provide the first and second switching control signals in response to a chip selection signal, wherein the first PTAC is configured to provide either the self-data or the other data to the memory controller in response to the first and second switching control signals.

12. A memory system comprising:

a memory module comprising memory devices arranged on a module board in ranks and columns, each of the memory devices being operatively designated in one of a first grouping and a second grouping; and a memory controller configured to control execution of a read operation directed to the memory devices, wherein the first grouping includes only memory devices arranged in a first rank nearest the memory controller and the second grouping includes memory devices arranged in all ranks other than the first rank, and only the memory devices in the first rank of the first grouping are each directly connected to the memory controller in parallel via a corresponding data port, each of the memory devices in the second grouping and arranged in a same column are indirectly connected to the memory controller via a corresponding memory device in the first grouping, and each of the memory devices in the first grouping are configured to selectively provide either self-data retrieved from a constituent memory core or other-data retrieved from a memory core of a memory device in the second grouping during the read operation.

13. The memory system of claim 12, wherein the corresponding memory device in the first grouping comprises first data pins, second data pins, third data pins and fourth data pins.

14. The memory system of claim 13, wherein the first data pins are connected to a data port connected to the memory controller, the second data pins are connected to a second memory device in the second grouping, the third data pins are connected to a third memory device in the second grouping, and the fourth data pins are connected to a fourth memory device in the second grouping, the second memory device, the third memory device and the fourth memory device being arranged in a same column as the corresponding memory device in the first grouping and each being indirectly connected to the memory controller in parallel by the corresponding memory device in the first grouping.

15. The memory system of claim 14, wherein the corresponding memory device in the first grouping comprises:

a first memory core configured to provide the self-data during the read operation; and a first path and timing adjusting circuit (PTAC) connected between the first memory core and the first data pins, wherein the first data pins transmit either the self-data from the first memory core or the other-data received by the first PTAC to the memory controller, and the first data pins receive the other-data from at least one of the memory devices in the second grouping.

16. The memory system of claim 14, wherein the first data pins are connected to the data port via a first internal data bus segment, the second data pins are connected to the second memory device via a second internal data bus segment, the third data pins are connected to the third memory device via a third internal data bus segment, and the fourth data pins are connected to the fourth memory device via a fourth internal data bus segment, whereby the second memory device, third memory device and fourth memory device are indirectly connected to the memory controller through the corresponding memory device.

17. The memory system of claim 15, wherein the second memory device comprises:

a second memory core configured to provide the self-data during the read operation; and a second PTAC connected between the second memory core and data pins connected to the second data pins, wherein the data pins transmit either the self-data from the second memory core or the other-data received by the second PTAC to the corresponding memory device in the first grouping.

18. The memory system of claim 15, wherein the first PTAC comprises:

a first delay unit connected to the first memory core;

a first switching unit connected to the first delay unit, the first switching unit including a plurality of first switches configured to be switched in response to a first switching control signal;

a first data input/output (I/O) buffer unit connected between the first switching unit and the first data pins;

a second switching unit connected to the first data I/O buffer unit, the second switching unit including a plurality of second switches configured to be switched in response to a second switching control signal;

a second delay unit connected to the second switching unit;

a second data I/O buffer unit connected between the second delay unit and the second data pins; and a switching signal generator configured to provide the first and second switching control signals in response to a chip selection signal, wherein the first PTAC is configured to provide either the self-data or the other-data to the memory controller in response to the first and second switching control signals.

19. The memory system of claim 15, wherein the first PTAC comprises:

a first delay unit connected to the first memory core;

a first switching unit connected to the first delay unit, the first switching unit including a plurality of first switches configured to be switched in response to a first switching control signal;

a second data input/output (I/O) buffer unit connected to the second data pins;

a second switching unit connected to the second data I/O buffer unit, the second switching unit including a plurality of second switches configured to be switched in response to a second switching control signal;

a retimer connected between the first and second switching units, wherein the retimer is configured to synchronously align the self-data or the other-data output to the memory controller with a clock signal during the read operation;

a first data I/O buffer unit connected between the retimer and the first data pins; and a switching signal generator configured to provide the first and second switching control signals in response to a chip selection signal, wherein the first PTAC is configured to provide either the self-data or the other data to the memory controller in response to the first and second switching control signals.

* * * * *